US006624388B1

(12) United States Patent
Blankenship et al.

(10) Patent No.: US 6,624,388 B1
(45) Date of Patent: Sep. 23, 2003

(54) SYSTEM AND METHOD PROVIDING DISTRIBUTED WELDING ARCHITECTURE

(75) Inventors: George Daryl Blankenship, Chardon, OH (US); Christopher Hsu, Mentor, OH (US); Edward Dennis Hillen, Painesville, OH (US)

(73) Assignee: The Lincoln Electric Company, Cleveland, OH (US)

( * ) Notice: Subject to any disclaimer, the term of this patent is extended or adjusted under 35 U.S.C. 154(b) by 0 days.

(21) Appl. No.: 09/770,064

(22) Filed: Jan. 25, 2001

(51) Int. Cl.[7] ............................................. B23K 9/095

(52) U.S. Cl. ................................ 219/130.5; 700/145

(58) Field of Search ............................ 219/130.5, 110, 219/125.1, 130.01; 700/100, 145; 709/219

(56) References Cited

U.S. PATENT DOCUMENTS

| | | | | |
|---|---|---|---|---|
| 5,463,555 A | * | 10/1995 | Ward et al. ................ | 700/100 |
| 5,805,442 A | * | 9/1998 | Crater et al. ............... | 709/219 |
| 5,808,885 A | * | 9/1998 | Dew et al. .................. | 219/110 |
| 5,850,066 A | | 12/1998 | Dew et al. | |
| 5,859,847 A | | 1/1999 | Dew et al. | |
| 6,002,104 A | * | 12/1999 | Hsu ........................ | 219/130.5 |
| 6,018,729 A | | 1/2000 | Zacharia et al. | |
| 6,040,555 A | | 3/2000 | Tiller et al. | |
| 6,087,627 A | | 7/2000 | Kramer | |

FOREIGN PATENT DOCUMENTS

EP 463489 * 1/1992

OTHER PUBLICATIONS

Rippey et al. "The NIST Automated Arc Welding Testbed", Proceedings of 7th Internatiional Conference on Computer Technology in Welding, Jul., 1997.*
"Arc Link Functional Specification", Engineering Document MS–595, Lincoln Electric Co., Aug. 1997.*
International Search Report dated Jul. 12, 2002 in PCT International Patent Application No. PCT/US02/01888 filed Jan. 22, 2002.
"ArcLink Functional Specification", Engineering Document MS–595; Aug. 1997; pp. 1–38.
"The NIST Automated Arc Welding Testbed"; W. G. Rippey, et al.; Proceedings of 7th International Conference on Computer Technology in Welding; Jul. 8–11, 1997; pp 1–8.

* cited by examiner

Primary Examiner—Clifford C. Shaw
(74) Attorney, Agent, or Firm—Amin & Turocy, LLP

(57) ABSTRACT

A system and method provides a distributed welding architecture in accordance with the present invention. The system includes a welder operatively coupled to a server and a network interface to enable a network architecture, the network architecture serving a network that communicates with at least one remote system. The remote system includes at least one remote interface to communicate with the network architecture, wherein the remote system accesses at least one HTTP socket to establish web communications with the welder and loads at least one application from the welder. The remote system accesses at least one Welding Application socket via the at least one application to exchange information between the welder and the remote system, wherein the at least one application includes at least one of a weld configuration component, a weld monitoring component, and a weld control component to interact with the distributed welding system.

68 Claims, 22 Drawing Sheets

SYSTEM AND METHOD PROVIDING DISTRIBUTED WELDING ARCHITECTURE

TECHNICAL FIELD

The present invention relates generally to computer and welding systems, and more particularly to a system and method providing a distributed welding architecture, wherein a network architecture is employed to enable remote configuration, monitoring, control and business interactivity within a distributed welding environment.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive.

One such challenge relates to coordinating, controlling and configuring unassociated welding systems. Conventional systems often require engineers and designers to travel to a plurality of different welding locations to manually change, and/or modify, a current production process. This may involve modifying programs associated with the control aspects of each welder, for example. After modifications have occurred, individual welders may then be tested at each location to verify one particular portion of the overall process. When the overall assembly operation is finally underway however, it may be discovered that some individual welders need to be "tuned" or modified in order to integrate with other welding systems contributing to the process. This may involve sending a systems engineer to each welding location in a large assembly operation to modify an individual portion of the process. Moreover, systems engineers may adjust a particular welder in an isolated manner without knowing if the latest adjustment suitably integrates into the overall assembly process. This is both time-consuming and expensive.

Another challenge facing welding systems relates to service and maintenance. Welders are often maintained and serviced according to procedures implemented by operators of the welding systems. Although some operators may adequately service and maintain these systems, quality of the service and maintenance is often up to the training and competence of the individual operator. Thus, a large collection of well-maintained welders servicing an overall assembly process may be at the mercy of another welding system that is not properly serviced or maintained. This may cause the process to stop or be disrupted during service outages relating to a poorly maintained welder. Even under the best of circumstances however, given that many welding systems are operating in an isolated manner, diagnostic information relating to the health of these systems is often not reported or discovered until after a breakdown occurs.

Still yet another challenge relating to conventional welding systems relates to ordering and supplying perishable items for the systems. As described above, these items may include wire, gas, and other components associated with the welding process. These materials are often tracked and ordered by operators or supervisors responsible for the process. This generally involves manually inventorying and keeping track of projected production needs and then ordering supplies long enough in advance so that production may continue. Manual processes such as are involved with ordering and inventory activities are time consuming and often require duplication of efforts by multiple people and departments. When orders are finally placed, mistakes can occur as catalog and/or part numbers are given to suppliers. Additionally, suppliers and distributors often have trouble planning for expected demands, since knowledge of actual product usage may not be gained until the order is actually placed. Thus, conventional isolated welding systems generally require more manual interventions and are harder to account for.

Due to the problems described above and other problems associated with conventional welding systems, there is an unsolved need for an improved welding architecture to facilitate remote monitoring, configuration, control, maintenance and supply to multiple welding systems that may be distributed across large areas or regions.

SUMMARY OF THE INVENTION

The following presents a simplified summary of the invention in order to provide a basic understanding of some aspects of the present invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to enable a distributed welding process via a network architecture. The network architecture provides a structure, protocol and remote communications interface between welders, and/or other remote systems, across internal networks and/or to broader networks such as the Internet, for example. These systems may include machinery in a plant production line, supervisory systems, inventory systems, quality control systems and maintenance systems associated with the welders. Communications between these systems facilitates such activities as electronic commerce, distributed control, maintenance, customer support, and order/supply/distribution of welding materials. Thus, the networked and distributed welding architecture of the present invention promotes a new generation of intelligent welding systems that improve upon conventional and somewhat isolated welding systems in favor of higher-level integration to achieve improved quality, productivity, and lower cost manufacturing.

In accordance with the present invention, a network server (e.g., web server) and network interface associated with a welding system enables a networked architecture of welders and/or other networked systems to provide remote functionality within a distributed welding process. This functionality may include remotely coordinating and controlling a plurality of welders and/or network of welders according to a higher-level command and control system in order to facilitate an overall manufacturing and supply process. Multiple welders distributed over large areas may be configured and controlled from a remote system without having to access and travel to individual welding stations. Remote monitoring of the process is provided as feedback in the control and coordination of the welders and is also utilized to enable diagnosis, maintenance and quality control, as well as other aspects that are described in more detail below.

The network interface may utilize one or more public domain and custom sockets adapted for welding communications along with a weld communications protocol to interact with the welder via the network. A configuration component may also be provided to enable remote configuration of the welding system via the network interface. Configurations may include programs and firmware associated with a weld controller, for example, as well as configurations relating to other welding system and/or operating procedures. A remote interface may also be provided that may reside within a browser, for example, to enable users to interact with the distributed welding process via the network server and interface. The remote interface includes monitoring and configuration aspects that enable users to remotely configure, monitor and control a plurality of welders that are adapted in accordance with the present invention. A security component may also be provided with the present invention in order to facilitate encrypted, authenticated and authorized remote welding communications and control over public networks such as the Internet.

The networked architecture of the present invention further enables the overall system of welders to be supplied and maintained. Welding supplies associated with the welders may be monitored either automatically and/or manually from remote systems to facilitate sales and order processing/forecasting in relation to perishable/replacement items relating to the welder. For example, a maintenance schedule may be maintained at the welder to track routine wear of items such as welding tips and other items that degrade over time. At predetermined intervals, orders can automatically and/or manually be transmitted to remote locations for replacement. Other process items such as weld wire or gas, for example, can be monitored and ordered as supplies diminish. Additionally, marketing and sales forecasting is facilitated by collecting and aggregating remote information from a large number of welders distributed across various factories, countries, and continents in a real time manner.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
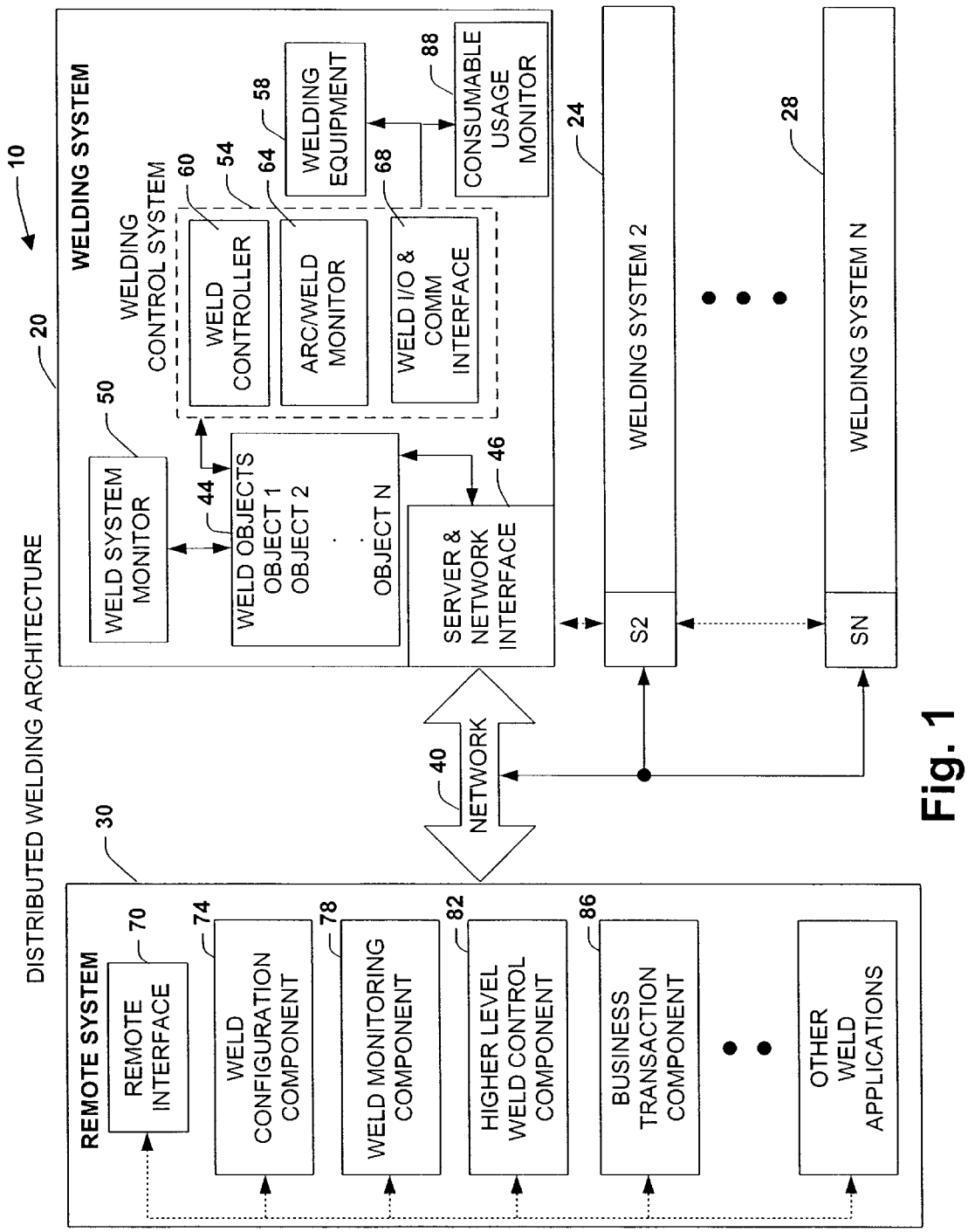
FIG. 1 is a schematic block diagram illustrating a distributed welding architecture in accordance with an aspect of the present invention.

The present invention is now described with reference to the drawings, wherein like reference numerals are used to refer to like elements throughout.

The present invention relates to a system and methodology to provide a distributed welding architecture wherein a plurality of welders and/or other remote systems are controlled, monitored, configured, and supplied via a higher-level network architecture adapted to the welding process. As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

A network server and associated interface are operatively coupled to a welder to enable the distributed welding architecture of the present invention. The network server executes a plurality of functional objects to interact with various portions of the welding process. These objects may be invoked from a remote system via network sockets adapted to the welder and associated with the network server and the objects. The remote system and/or other welding system may "bootstrap" components and/or applications for interacting with the functional objects provided by the network server. These components may include a monitoring component, a configuration component, a control component, and a business transaction component. A command and interface welding protocol is provided to facilitate network control and monitoring of individual welders, wherein the protocol communicates status and control information to and from remote systems over the network thus enabling control of a plurality of distributed welding systems at a higher-level.

The network server may also include interacting with web pages for example, and may provide access to a remote system/browser and/or local browser to interface with the welder. The remote system includes at least one standard socket (e.g., HTTP) for web communications and at least one custom socket (e.g., Welding Application Socket) to exchange information between the welder and the remote system. For example, the standard socket can be an HTTP socket, an FTP socket, a TELNET socket, and/or other network socket. It is noted that the terms "web" and "http" are substantially interchangeable, however, "web" does not include FTP or TELNET which are separate protocols. The standard socket enables the remote system to load a variety of applications and/or tools that facilitate system performance and access to the applications and/or tools. For example, the applications may invoke or bootstrap Welding Application sockets that encapsulate a welding system's native addressing and command arguments, wherein suitable routing and request arguments may be served by a welder's native network and operating system. The network may employ User Datagram Protocol (UDP) protocol, wherein a client system may proxy requests over the socket to/from a welder's native system. The welder's native system may include one or more control processors and a native welding Local Area Network (LAN) connecting the control processors with one or more logical processes and/or "objects" executing on the control processor. A database provides access to methods/properties exhibited by each object.

Referring initially to FIG. 1, a distributed welding architecture 10 is illustrated in accordance with an aspect of the present invention. The distributed welding architecture 10 includes a welding system 20, one or more other welding systems, depicted as welding system 24, and welding system N 28, N being an integer, that are operatively coupled to a remote system 30 via a network 40. The remote system 30, which can be a computer or other welding system interacts with the welding systems 20–28 by invoking weld objects 44 such as illustrated in the welding system 20. The weld objects 44 provide functional interaction with various aspects of the welding system 20. These aspects may include controlling, monitoring and communicating with the welding system 20, for example. Communications are provided by a server and network interface 46 and may include a collection, group, and/or cluster of servers and/or clients, for example, that opens network sockets (not shown) to communicate with the weld objects 44. As will be described in more detail, the server and network interface 46 may include a web server or servers, for example, that provide remote browsing interactivity with the welding system 20. An embedded web browser, described below, may also be provided that may act as a client, for example, to other remote systems or welders. Other client functionality within the welding system 20, for example, may include an e-mail sender (e.g., SMTP client) to send messages to other network systems.

Other portions of the welding system 20 that are described in more detail below may include a weld system monitor 50 and a weld control system 54 that controls welding equipment 58. The welding equipment 58 is the physical hardware producing the weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source (not shown). The weld control system 54 may include a weld controller 60, an arc/weld monitor 64, and weld I/O and communications interface 68 to control the welding equipment 58.

By coupling the welding systems 20–28 to the network 40, a higher-level of control and efficiency is established over conventional welding systems. The network 40 may include broad public networks such as the Internet or may be configured for local Intranet and/or dedicated control networks. As an example, the network 40 may employ Ethernet (IEEE 802.3), Wireless Ethernet (IEEE 802.11), PPP (point-to-point protocol), point-to-multipoint short-range RF (Radio Frequency), WAP (Wireless Application Protocol) and Bluetooth. Higher-level control and monitoring is achieved by executing remote components within the remote system 30 to monitor and control various aspects within the welding systems 24–28. These components may include a remote interface 70, a weld configuration component 74, and a weld monitoring component 78 that may include an arc stability monitor and a weld quality monitor, for example. Other remote components may include a higher-level control component 82, and a business transaction component 86. It is noted that the components 70–86 may interact with each other and may all or in part be executed within the remote system 30 and loaded from the welding systems 20–28. The remote interface 70, which may include a browser, enables users to remotely monitor, configure, control and to conduct commercial transactions with the welding systems 20–28. As will be described in more detail below, the remote interface 70 may load one or more of the weld objects 44 which may be configured as an applet, for example. The applet may then utilize web pages that are served by the server and network interface 46 and invoke one or more public domain and/or custom sockets (not shown) to facilitate communications with the welding systems 20–28.

Remote configuration of the welding systems 20–28 is provided by the weld configuration component 74. This enables weld designers and engineers to upgrade or modify various aspects of the welding systems 20–28 from remote locations. These aspects may include upgrading or modifying procedures, firmware and/or programs associated with the weld control system 54. As will be described in more detail below, the remote interface 70 may access a database containing the programs and firmware and provide a configuration screen (e.g., Graphical User Interface) to facilitate the upgrade. The remote interface 70 also enables engineers to manipulate logic, timing, waveform and dynamic behavior within the weld control system 54 as will be described in more detail below.

The weld monitoring component 78 enables remote monitoring and logging of production and control information from the welding systems 20–28, provides this information to the remote interface 70 and logs the information to a database (not shown). This is achieved by aggregating a plurality of welding system variables (e.g., query each welding system for monitored variables, receive event messages) from the welding systems 20–28. For example, these variables may be provided by the weld system monitor 50 and the arc/weld monitor 64. The arc/weld monitor 64 monitors control aspects of the welding control system 54. This may include information relating to feedback, counters, timers, and/or other variables that reflect the state of the weld control system 54. The weld system monitor 50 collects information relating to the overall welding system 20. This information may include operator time in/out shift information and information relating to maintenance of the welding system 20, for example. A consumable usage monitor 88 may also be included to monitor welding supplies (e.g., gas usage, wire usage) that have been consumed during a particular time interval, for example. Other monitoring aspects may include quality control monitoring such as monitoring arc stability feedback from the arc/weld monitor 64. Additionally, the weld monitoring component 78 may receive alarms or other events that are triggered from the monitored variables.

The higher-level control component 82 facilitates controlling and/or coordinating one or more remote welding systems. This is achieved by directing synchronous and/or asynchronous commands to the weld control system 54 and monitoring command execution results via the weld monitoring component 78. As will be described in more detail below, commands may be directed via a weld command protocol that utilizes a datagram socket and/or a stream socket to interact with control functions in the welding systems 20–28. The business transaction component 86 enables remote ordering and supplying of welding materials to the welding systems 20–28. Perishable welding materials (e.g., supply variables indicating amount of materials on hand) can be monitored by the consumable usage monitor 88 and transferred to the weld monitoring component 78 and supplied to the business transaction component 86. Based upon the monitored information, orders can automatically be placed with suppliers of the welding materials via the business transaction component 86 and the network 40 (e.g., supply variables dropping below a predetermined threshold triggering order). It is noted that materials may be manually monitored from the remote interface 70 and manually ordered from either the remote system 30 or the welding systems 20–28.

Figure 2:
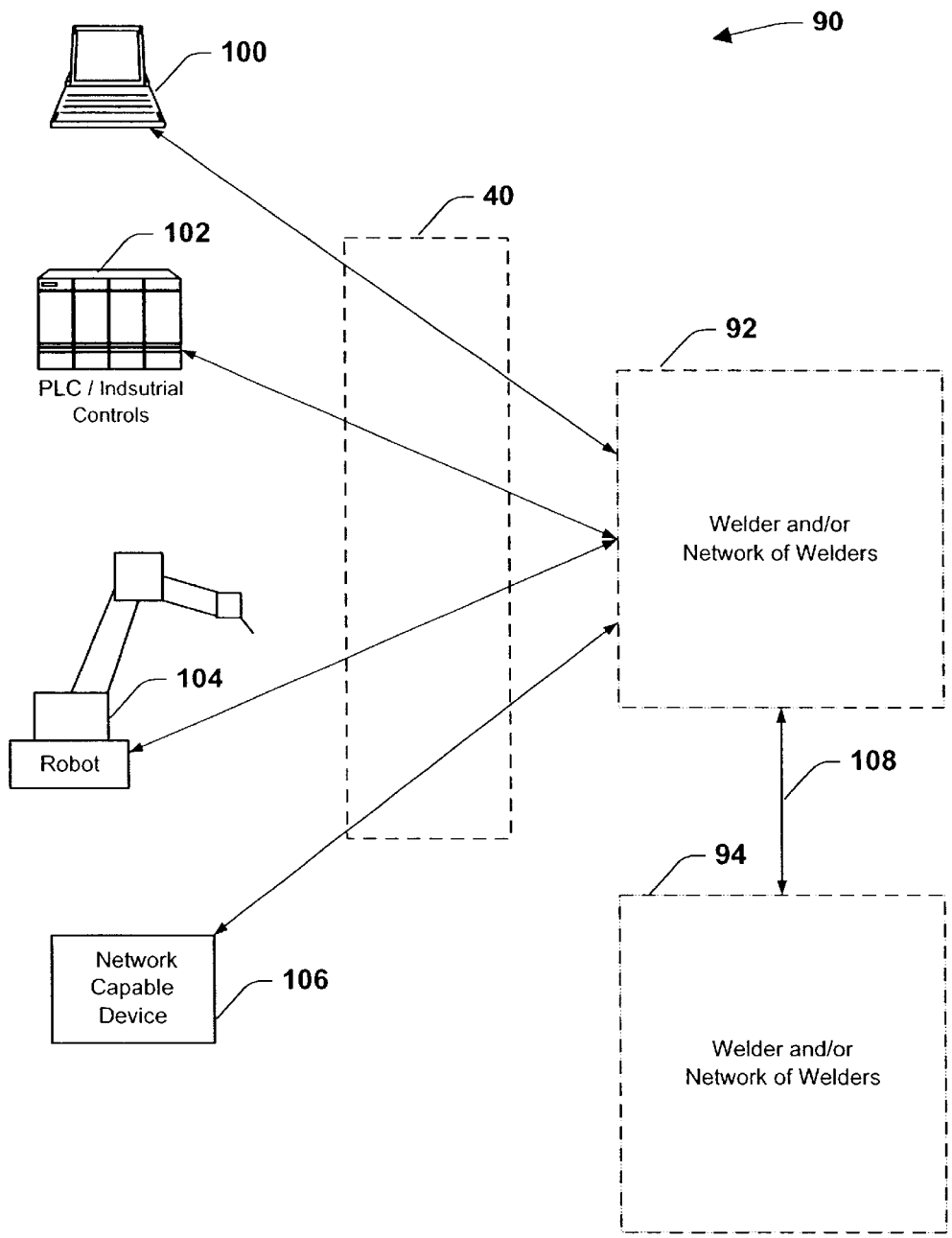
FIG. 2 is a schematic block diagram illustrating an exemplary welding and remote system network configuration in accordance with an aspect of the present invention.

Referring now to FIG. 2, a system 90 illustrates an exemplary network configuration in accordance with the present invention. The system 90 includes one or more welders 92 and 94 adapted with a network server and interface as described above. It is noted that the welders 92 and 94 may also be included within a network of welders as will be described in more detail below. Each welder 92 or 94 may communicate over the network 40 to a plurality of network enabled devices. These devices may include a remote computer 100, an industrial controller 102, such as a programmable logic controller, a robot 104, and/or other network capable device 106 (e.g., TCP device). In accordance with the present invention, the network enabled devices 100–106 may open one or more welding protocol sockets (not shown) or network sockets and execute components or objects, such as an applet, to facilitate direct and timely access to the welders 92 and 94. Each welder 92 and 94 may include program components to control and monitor the welders and may utilize a plurality of welding protocol sockets to communicate with the program components and the network enabled devices 100–106. The welding protocol sockets may also facilitate communications between welders wherein one welder acts as a client and another welder acts as a server or vis versa and is illustrated as an operative connection 108. As depicted by the system 90, welders 92 and 94 may be integrated in an overall distributed architecture of plant floor control. This enables the welding process as well as other processes such as the robot 104 and industrial controller 102 to be monitored and controlled from one or more remote locations without sending systems engineers or operators to each process station to modify or diagnose the operating conditions of the welders.

According to another aspect of the present invention, integration to a third party's subsystem web server is provided. For example, each of the network enabled devices 100–106 may include an integrated web server. Other examples of third party subsystems may include part manipulators, a weld monitoring device, a CAD/CAM system, a laser vision system, a surveillance camera system, wherein each subsystem may include its own web server. To provide a unified "system overview" presentable to a user, information and controls are integrated and/or consolidated to/from the web servers residing on subsystems.

An entry point (e.g., home page of the welding system) can be located in any one subsystem, wherein the entry point may originate from the subsystem that has the most resources (e.g., memory, processing capability). These resources may include Web page redirecting technology to acquire web content from any of the subsystems in order that users perceive a unified view of the welding system. As will be described in more detail below, a Java applet, for example, can be executed to acquire data from one or more data servers, such as a web server to present the collection of data graphically within a web browser, for example. It is noted that a web page, including a home page, can be located on a particular web server, wherein the applet referenced in those pages can reside on or be retrieved from another web server.

Figure 3:
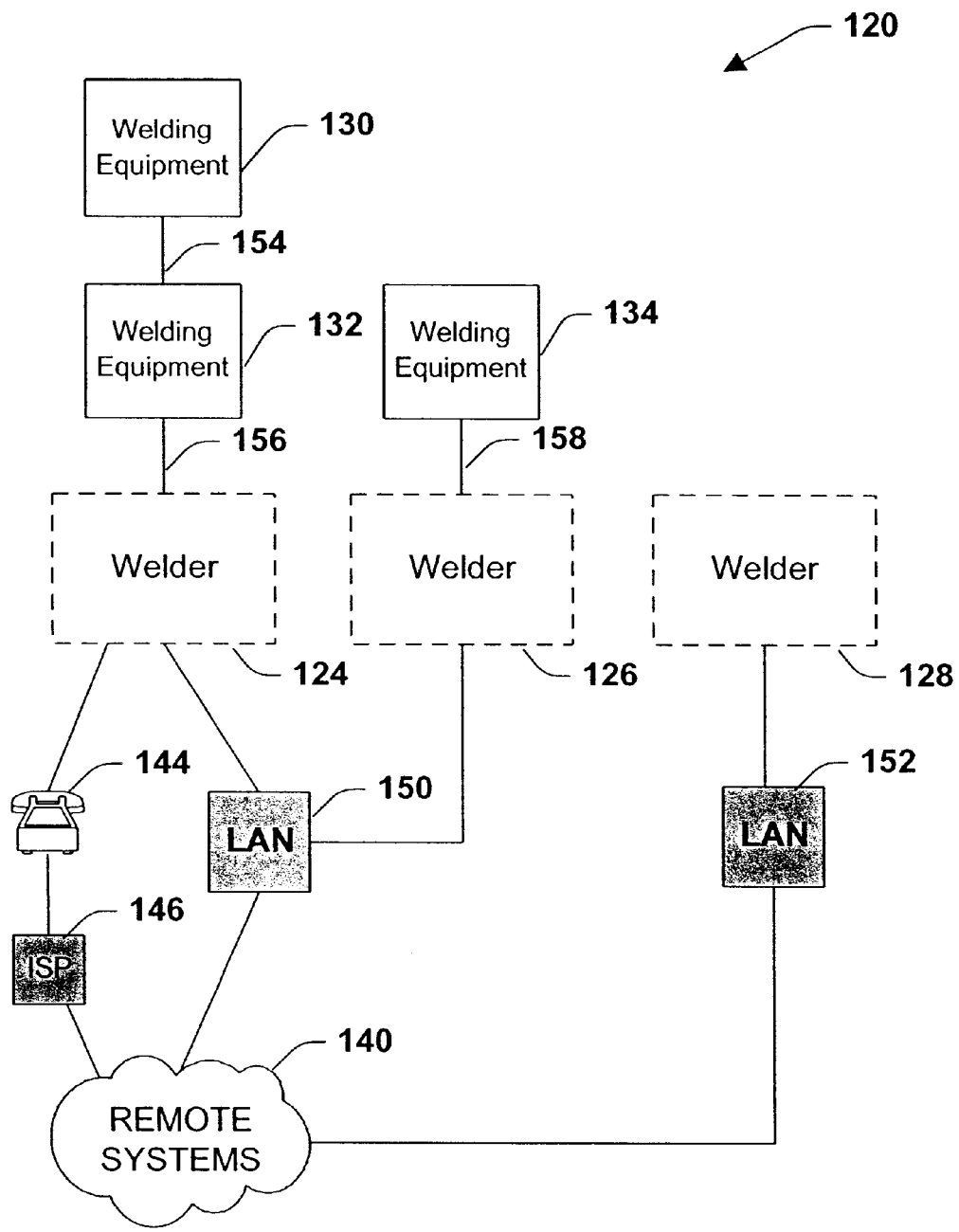
FIG. 3 is a schematic block diagram illustrating a welding network in accordance with an aspect of the present invention.

Referring now to FIG. 3, a system 120 illustrates one possible configuration for a network of welders in accordance with the present invention. Three welders 124, 126, and 128 are depicted in the system 120, however, it is to be appreciated that various other configurations, connections and welders are contemplated and are within the scope of the present invention. Each welder 124 through 128 may include one or more instances of a component (not shown) for controlling one or more groupings of welding equipment 130–134. For example, the welder 124 controls two separate groupings of welding equipment 130 and 132 whereas the welder 126 controls welding equipment 134. Each welder 124–126 may have one or more network connections to a plurality of remote systems 140. For example, these connections may support an Internet protocol (e.g., Internet Protocol version 6) such as TCP/IP and is described in more detail below. For example, one possible connection is supported via a phone connection 144 to an Internet Service Provider (ISP) 146 to the remote systems 140. Another possible connection is via a Local Area Network (LAN) 150 and 152 to the remote systems 140. The LAN connection 150 also supports communications between one or more welders such as depicted between welders 124 and 126. By providing the network connections as illustrated in the system 120, one or more remote systems 140 can control and/or coordinate multiple instances of welding equipment 130–134 that may also be separated by great distances. Moreover, some welders can control and/or coordinate other welders and associated welding equipment as illustrated by the LAN connection 150 between welders 124 and 126. It is noted that the welders 124–126 and associated welding equipment 130–134 may communicate over a separate and isolated network from the remote systems 140. These connections are illustrated at reference numerals 154–158.

Figure 4:
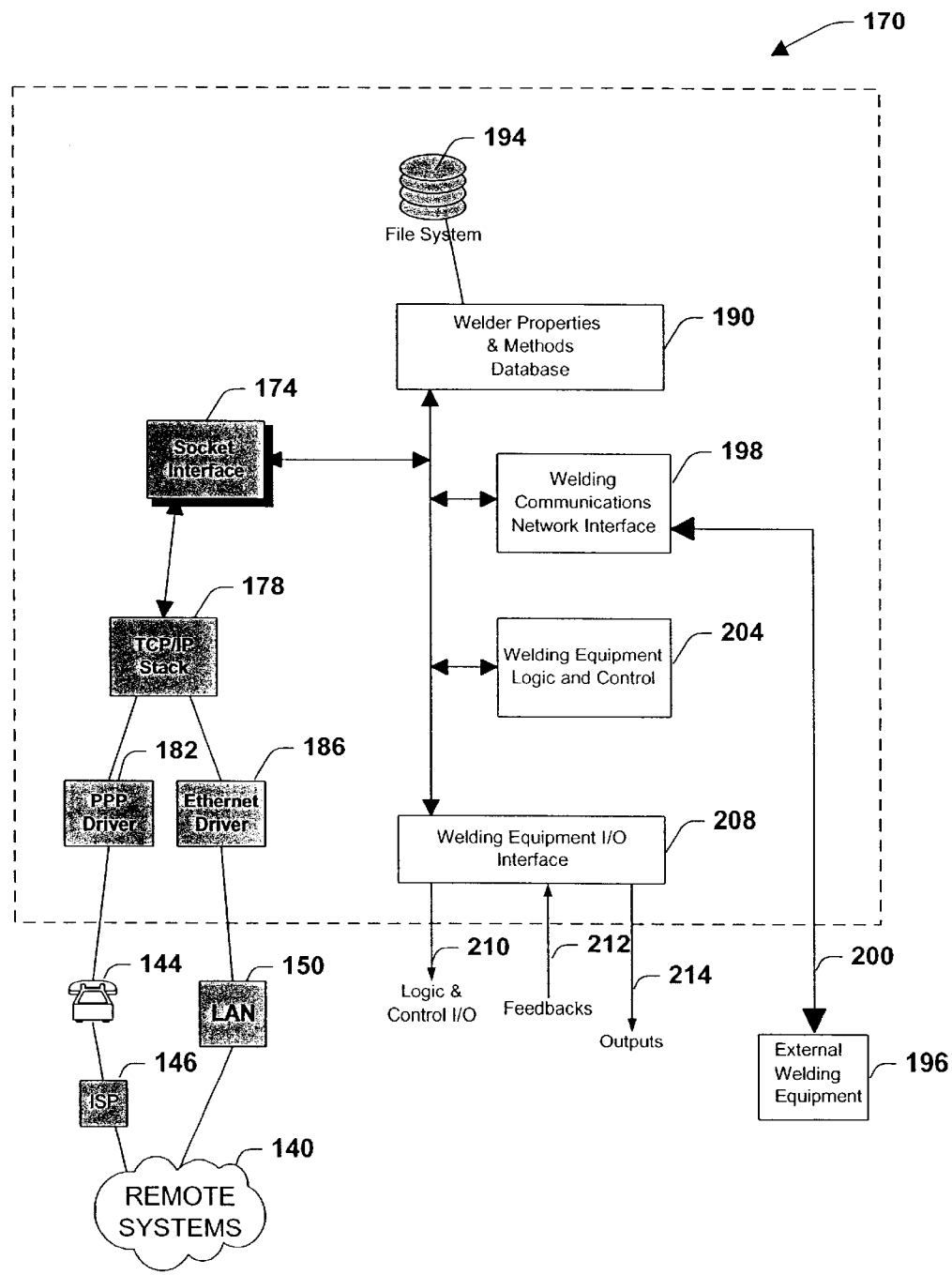
FIG. 4 is a schematic block diagram illustrating a welding controller and network interface in accordance with an aspect of the present invention.

Turning now to FIG. 4, a system 170 illustrates a more detailed network and welding communications architecture in accordance with the present invention. The system 170 includes a socket interface 174 that directs/translates welding communication protocol to/from TCP/IP and is instantiated by a TCP/IP stack 178. Each socket instance, which may be invoked from a remote browser and/or other application, includes information about the welder such as an IP address and port address. The TCP/IP stack 178 presents a layered communications interface to networks such as the Internet and is described in more detail below in relation to FIG. 6. The TCP/IP Stack 178 may interface to one or more drivers to communicate with the remote systems 140. One possible driver is a point-to-point (PPP) driver 182 for communicating over the phone line 144 and to the ISP 146. Another possible driver is an Ethernet driver 186 that communicates through the LAN 150 to the remote systems 140. It is to be appreciated that a plurality of other drivers and network interfaces are possible. For example, The TCP/IP stack and associated physical network may reside on a Gateway device wherein protocols may be translated from one network protocol to another.

As described above, the welding system 170 includes objects or components to interact with the functional aspects of the welder. These objects or components may be stored in a welder properties and methods database 190 which may be accessed from a local or remote file system 194 such as a standard operating system directory structure. The functional aspects controlled by the objects may include commanding the welder on or off, changing machine output levels, selecting welding procedures, configuring machine I/O, monitoring machine feedback, transferring operating code or firmware, and retrieving machine diagnostics, for example. Other higher-level components such as E-Mail, quality control, and order processing may also be provided. Each of the functional aspects are uniquely addressed and routed according to the object, with an associated service code (e.g., to distinguish object methods from properties) and an identifier to distinguish one method/property from another method/property contained within the same object. Objects may be directed to external welding equipment 196 via a welding communications network interface 198 and welding network 200. It is noted that communications over the welding network 200 to the welding equipment 196 may be provided by a protocol separate and distinct from TCP/IP.

The system 170 also includes a welding equipment controller 204 for controlling the welding equipment 196. This includes such functionality as monitoring feedback and controlling outputs within a closed loop process. Other logic may include timing and sequencing logic for controlling various aspects of the welding process. It is noted that more than one control loop may be enabled. For example, one loop may control the arc that is provided by the welding equipment 196 and a separate loop and/or controller for controlling a wire feeder associated with the welding equipment 196. The second loop would control a motor supplying the wire feeder; for example. A welding equipment I/O interface block 208 is also provided for interacting with the welding equipment 196. For example, the I/O block 208 provides control and logic outputs 210 (e.g., analog/digital voltages/current), receives machine feedback 212 (e.g., analog conversion inputs, pulse conversion inputs) and provides other discrete outputs 214 (e.g., 120, 240, 480 volt AC/DC) to control the welding equipment 196.

Figure 5:
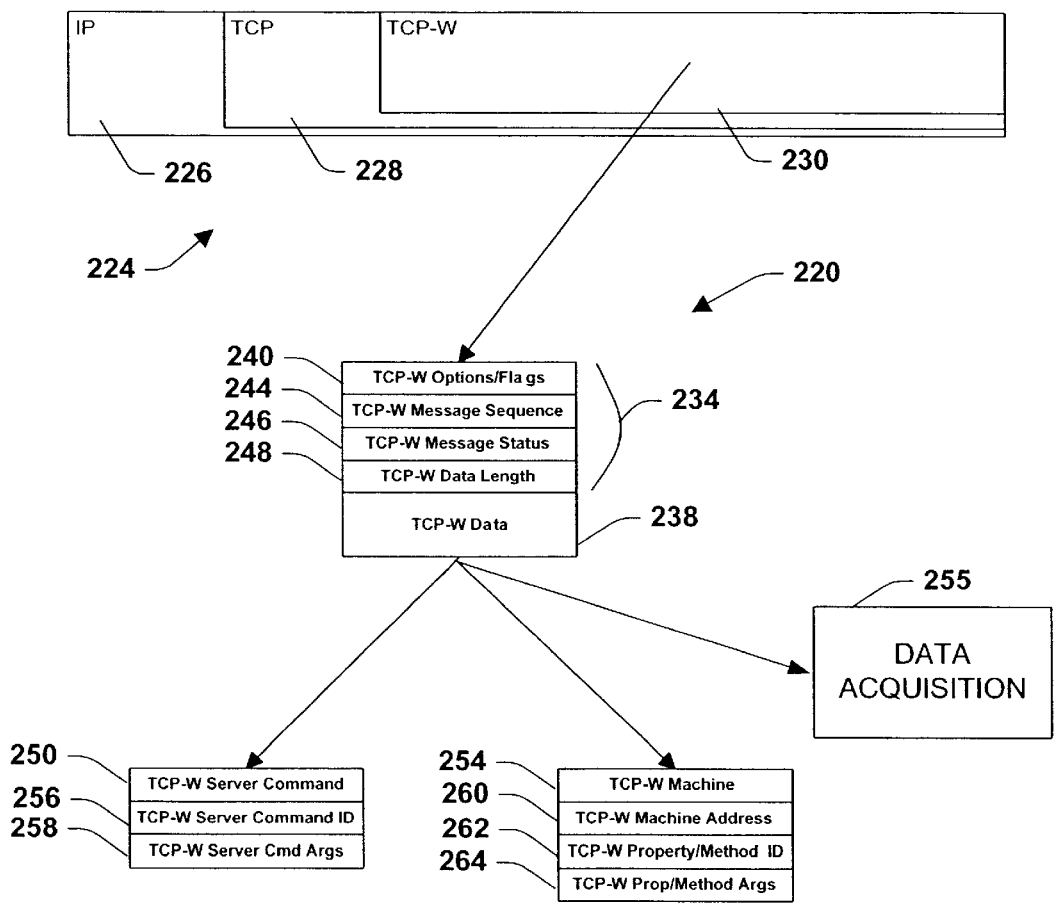
FIG. 5 is a diagram illustrating a welding protocol in accordance with an aspect of the present invention.

Turning now to FIG. 5, a welding protocol 220 is illustrated for communicating and controlling various portions of the welding system in accordance with the present invention. A portion of a TCP/IP packet 224 includes an IP stack 226, a TCP stack 228, which are well understood network protocols and a TCP-W field 230 to communicate with functional objects within the welding system. The TCP-W field 220 may include an optional header 234 and data field 238. The header field 234 may include an options/flags field 240, a message sequence field 244 (e.g., client sets—server echoes), a message status field 246, and a message length field 248 indicating the length of the data field 238 that follows the header 234. The data field 238 can be categorized as server commands 250 to configure the network server or machine commands 254 to the welding machine (e.g., the "real" work being done). A data acquisition field 255 may also be included that enables streaming data for high-speed welding signals. For example, this data may relate to voltage, amperage, wire speed, motor current, and other welding signals or information.

In general, the network server commands 250, may include a server command ID 256 and server command arguments 258, can be utilized by remote systems to configure network server behavior as it relates to communications. This can include establishing an inactivity watchdog, for example, whereby the welding equipment recognizes that the remote system has "gone away" and therefore turns its (the welding machine's) output off.

The machine commands 254 have additional information specifying which logical/physical machine and/or object/ entity is being addressed (e.g., a "weld controller", a "wire controller", a "gas controller"). The machine commands 250 may include a machine address field 260 and method/property ID and arguments field 262 and 264 respectively, to specify within an object what property/method is being addressed or invoked.

It is noted that the system illustrated in FIG. 4 and the protocol described in FIG. 5, may be executed and/or independent of Web technologies. As an example, an application layer (e.g., socket) of TCP/IP may encapsulate the welding system's native addressing and command arguments such as a Welding Application socket. Moreover, an agent (e.g., server/client component) may proxy requests over such a socket to/from a welder's native system. For example, the welder's native system may include one or more control processors, or if the native system is composed of multiple processors, a native welding LAN separate and distinct from Welding Application sockets may couple the control processors. This may include one or more logical processes, tasks, and/or "objects" executing on the one or more control processors, wherein databases, tables and/or spreadsheets may provide access to methods/properties exhibited by each object. It is noted that the agent may be embedded in the welding system itself or reside externally as a gateway, for example. Furthermore, applets or applications may be served by a web server, resident on and/or remote to the welding system that may in turn open a Welding Application socket port that enables the applet or application to address and control the welding system directly.

Figure 6:
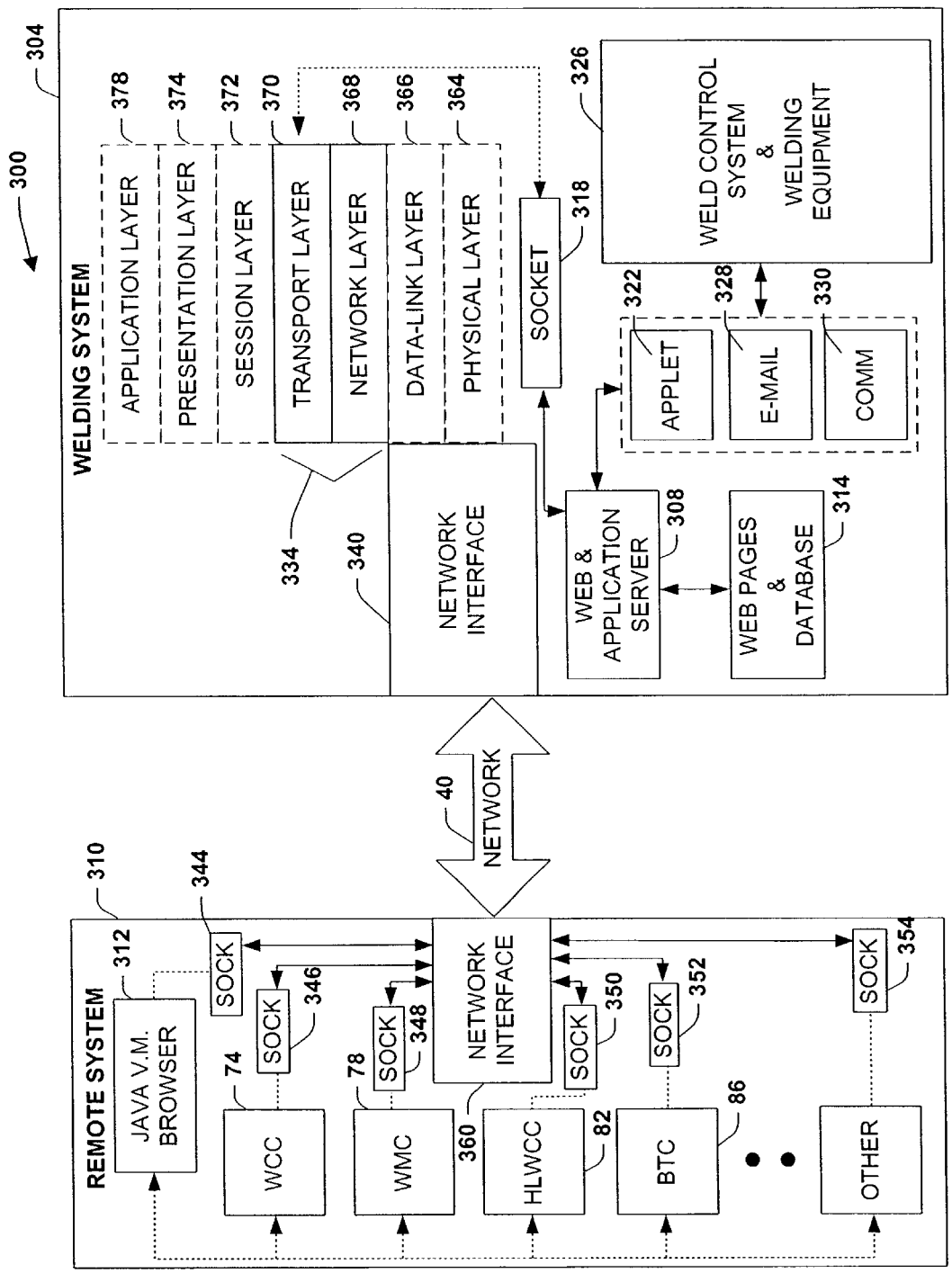
FIG. 6 is a schematic block diagram illustrating a more detailed network interface and communications architecture in accordance with an aspect of the present invention.

Referring now to FIG. 6, a system 300 illustrates a more detailed network communications architecture in accordance with the present invention. A welding system 304 may include a web server 308 that provides information exchange with a remote system 310. The remote system 310 may include a browser 312 that communicates with the web server 308. Welding information may be exchanged via web pages and/or content included within a database 314 associated with the web server 308. Web content may include but is not limited to such technologies as HTML, SHTML, VB Script, JAVA, CGI Script, JAVA Script, dynamic HTML, PPP, RPC, TELNET, TCP/IP, FTP, ASP, XML, PDF, WML as well as other formats. The browser 312 which can reside in the remote system 310 or other welding systems, communicates with the web server 308 via one or more sockets 318 and loads one or more objects such as an applet 322.

It is noted that each object or applet 322 may be associated with one or more sockets 318. As an example, the browser 312 may load a web page or other application from the welding server 308 via a public domain or standard socket such as a Hyper Text Transfer Protocol (HTTP) socket, a File Transfer Protocol (FTP) socket, a Simple Mail Transfer Protocol (SMTP) socket, a Remote Procedure Call (RPC) socket, a Remote Method Invocation (RMI) socket, a Java Database Connectivity (JDBC) socket, an Open Database Connectivity (ODBC) socket, a Secure Sockets Layer (SSL) socket, a Network File System (NFS) socket, a Windows socket such as Winsock, a Point-of-Presence 3 (POP3) socket and a TELNET socket. The web page may then enable other welding applications to be invoked and communicated with by opening or "bootstrapping" additional sockets 318 from a pool of public domain and/or custom sockets that interact with specific components and/or functionality within the welding system 304.

For example, the applet 322 may be configured to monitor welding components that communicate via a native welding system bus (not shown). When the applet 322 is invoked and loaded from the remote system either from the browser 312 and/or from another application, a Welding Application socket, such as a custom socket, and/or other public domain socket may be instantiated to exchange weld monitoring information between the applet 322 and the remote system 310. The Welding Application Socket (WAS) can be adapted to exchange welding protocol, such as described above in relation to FIG. 5, between the remote system 310 and the welding system 304. This may include transmitting and receiving welding command and monitoring data via the welding protocol described above, for example. Additionally, the WAS may be adapted to communicate with particular aspects and/or applications associated with the welding system (e.g., welding equipment, weld controller, weld monitor, consumable usage monitor) over an internal welding system bus, wherein the applications interact and communicate via the WAS to other local systems (e.g., web servers operatively coupled via a factory Intranet) and/ or to remote systems (e.g., browsers, monitors, controllers, operatively couple via the Internet). It is noted that a welding system may be configured using only HTTP or another commercially available Internet protocol, however, the efficiency may not provide for suitable control of the welding system.

The applet 322 (e.g., JAVA applet) may run within the browser 312 to exchange information with the welding system 304. A JAVA Virtual Machine (JVM) may be included to run the browser 312 and execute the applets 322. JAVA Virtual Machines are a software implementation of a "virtual CPU" designed to run compiled JAVA code. This may include stand-alone JAVA applications as well as the applets 322 that are downloaded to run the browser 312. The applet 322 can further be configured to transmit welding operating data (e.g., arc start failure counts, consumable usage data, equipment utilization up/down time) to the manufacturer of the welding equipment, receive and display information (e.g., advertising, program upgrade, and product recall or upgrade, new product introduction, and applications and service support) from the manufacturer. The applet 322 can also be adapted not to function (e.g., closes, sends error messages) unless the applet detects the presence of a welding power supply and/or other portion of the welding system from a named manufacturer and/or the presence of an Internet connection to the welding equipment manufacturer's data server.

Along with the applet 322 for serving the browser 312, the web server 308 may invoke other objects or programs for interfacing to a weld control system and associated welding equipment 326. For example, these programs may include an e-mail component 328 for sending unsolicited and/or other messages to the remote system 310. A communications component 330 may be provided to transfer files to or from the database 314. For example, a File Transfer Protocol (FTP) component may be provided to transfer files. As described above, the socket 318 interfaces with a TCP/IP stack 334 that may be associated with several layers. The layers transfer data to and from a network interface 340 that couples to the network 40. It is noted that logic from one or more of the layers may be incorporated within the network interface 340 and that more than one socket 318 may be employed to communicate with various objects within the welding system 304. For example, a stream socket may be employed that provides an end-to-end, connection-oriented link between two sockets utilizing TCP protocol.

Another type socket is a datagram socket that is a connectionless service that utilizes User Datagram Protocol (UDP). UDP services are well suited to bursting traffic patterns and are employed to send control commands from the remote system 310 to the welding system 304. UDP enables a plurality of welding systems to receive control commands in a more concurrent manner. As illustrated, the remote system 310 may include a plurality of sockets 346–354 adapted to interface components 312, the weld control component 74, the weld monitoring component 78, the higher-level weld control component 82, and the business transaction component 86 that communicate to a network interface 360. The sockets 346–354 may include HTTP and/or Welding Application Sockets as described above and may be received and loaded from the web server 308.

As described above, the TCP/IP stack 334, which is well understood, may be associated with one or more other network layers. A physical layer 364 may be provided that defines the physical characteristics such as electrical properties of the network interface 340. A data-link layer 366 defines rules for sending information across a physical connection between systems. The TCP/IP stack 334 may include a network layer 368, which may include Internet protocol (IP) and/or Internet Protocol version 6 (IPv6), defines a protocol for opening and maintaining a path on the network 40. A transport layer 370 associated with the TCP/IP stack 334, may include Transmission Control Protocol (TCP), that provides a higher level of control for moving information between systems. This may include more sophisticated error handling, prioritization, and security features. A session layer 372, presentation layer 374, and application layer 378 which are well understood may also be optionally included that sit above the TCP/IP stack 334.

It is noted that the server 308 can be a web server or an HTTP server, wherein an application loaded from the welding system 304 to the remote system 310 can be a Java applet or a Java application, for example. The application may request web pages (e.g., HTML documents) from the welding system 304 via an HTTP socket, wherein the web pages are dynamically generated by the welding system 304 and may include live welder operating parameters. The web pages may be parsed by the application to extract welder operating parameters, wherein the operating parameters can be displayed graphically within the browser 312, processed by an algorithm, and/or recorded into a log file. Additionally, one or more URLs associated with the web pages may include commands, parameter settings changes, and/or instructions or functions to be executed by the welding system 304, when the web pages are requested by the remote system 310.

Figure 7:
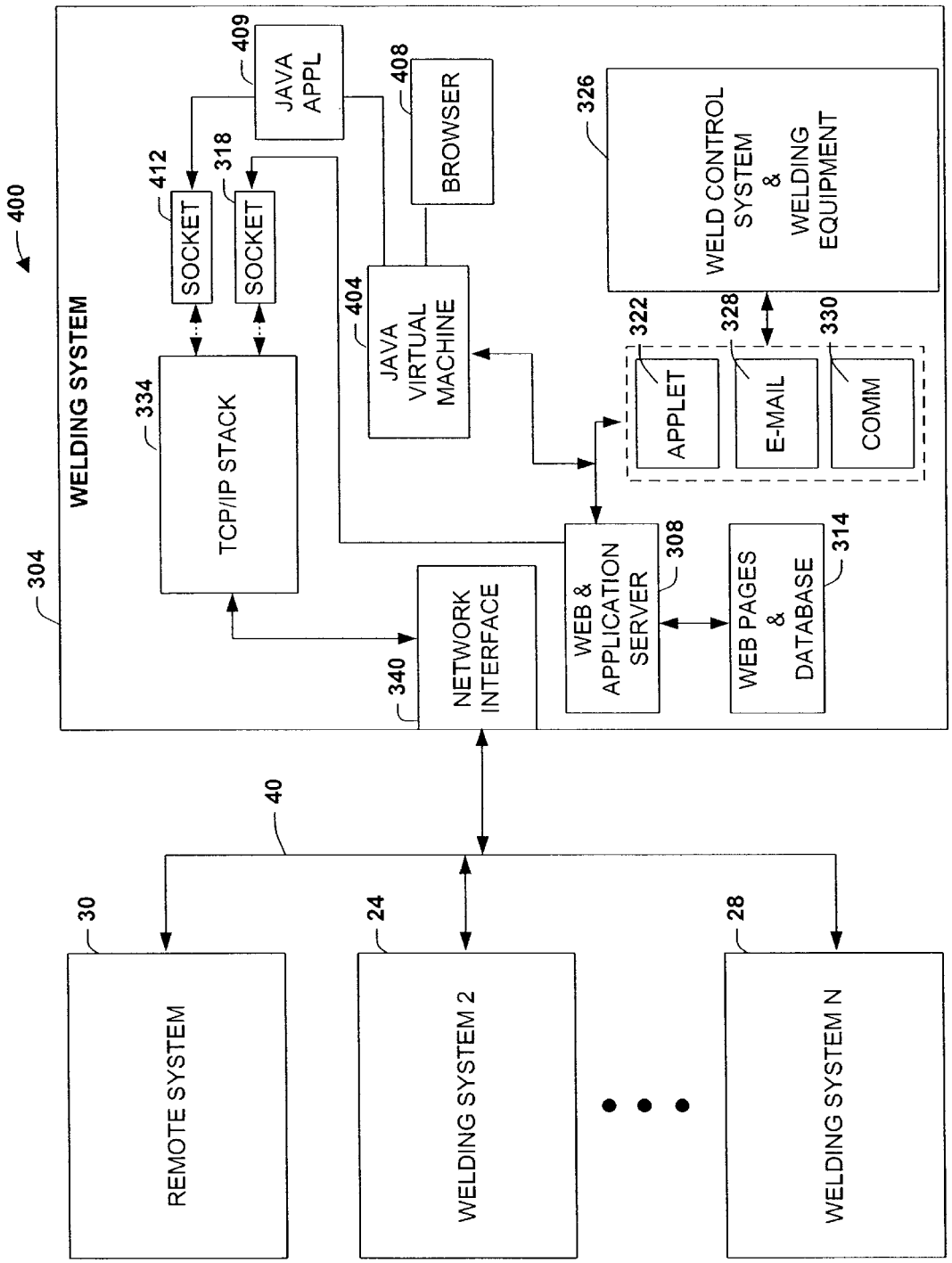
FIG. 7 is a schematic block diagram illustrating an integrated welding interface in accordance with an aspect of the present invention.

Referring now to FIG. 7, a system 400 illustrates an alternative aspect of the present invention. According to this aspect of the invention, a Java Virtual Machine 404 and associated browser 408 may be included within the welding system 304 to provide a local interface to one or more remote welding systems 24–28 and/or remote system 30. This enables an operator for example to load weld configurations/procedures from other systems, monitor/diagnose the local system 304 and/or other systems and send/receive orders from other systems. As illustrated, the JAVA Virtual Machine 404 may execute a JAVA application or program 409 and communicate to a socket 412. The socket 412 may be configured to interface between the JAVA applications/applets and the TCP/IP stack 334 to enable network communications.

Figure 8:
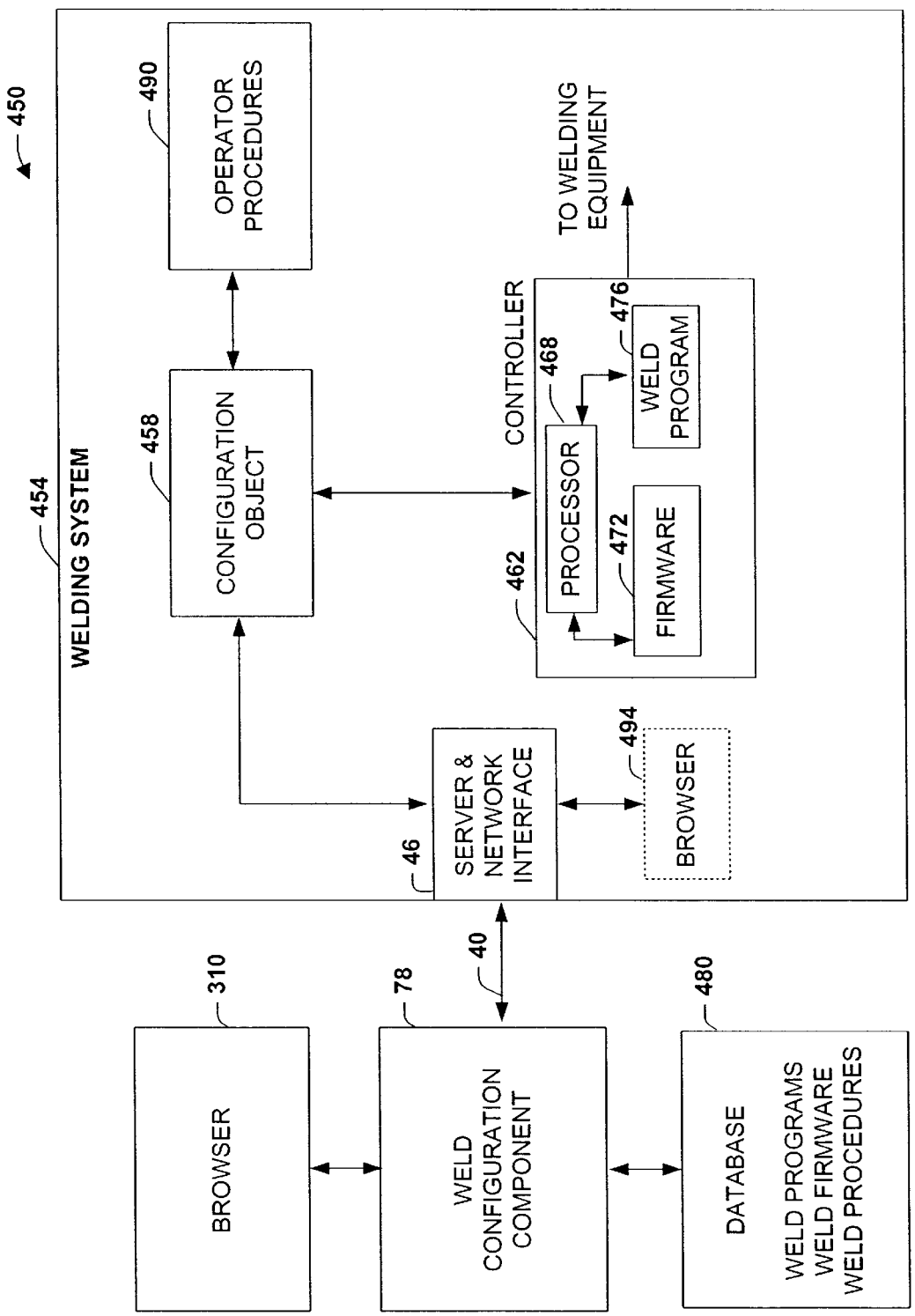
FIG. 8 is a schematic block diagram illustrating a welding configuration system in accordance with an aspect of the present invention.

Turning now to FIG. 8, a system 450 illustrates a more detailed weld configuration architecture in accordance with the present invention. The system 450 includes a welding system 454 having a configuration object 458 and controller 462. The controller 462 may include a processor 468 with associated firmware to control the processor and a weld program 476 to control welding equipment. In accordance with the present invention, a browser 310 initiates a weld configuration update by invoking the weld configuration component 78 that accesses a database 480. The database 480 may include stored weld programs, firmware and/or operating procedure data for the welding system 454. From the browser 310, an operator selects a desired function such as firmware or program data. After a selection is made, the browser 310 invokes the configuration object 458 and begins a download of data from the database 480 via the weld configuration component 78. The configuration object 458 receives the data and proceeds to upgrade or modify the controller firmware 472, program 476, and/or operator procedures 490 associated with the welding system 454. It is to be appreciated that other functions may be similarly updated. As an alternative, a local browser 494 may be included to provide a remote invocation of the weld configuration component 78.

Figure 9:
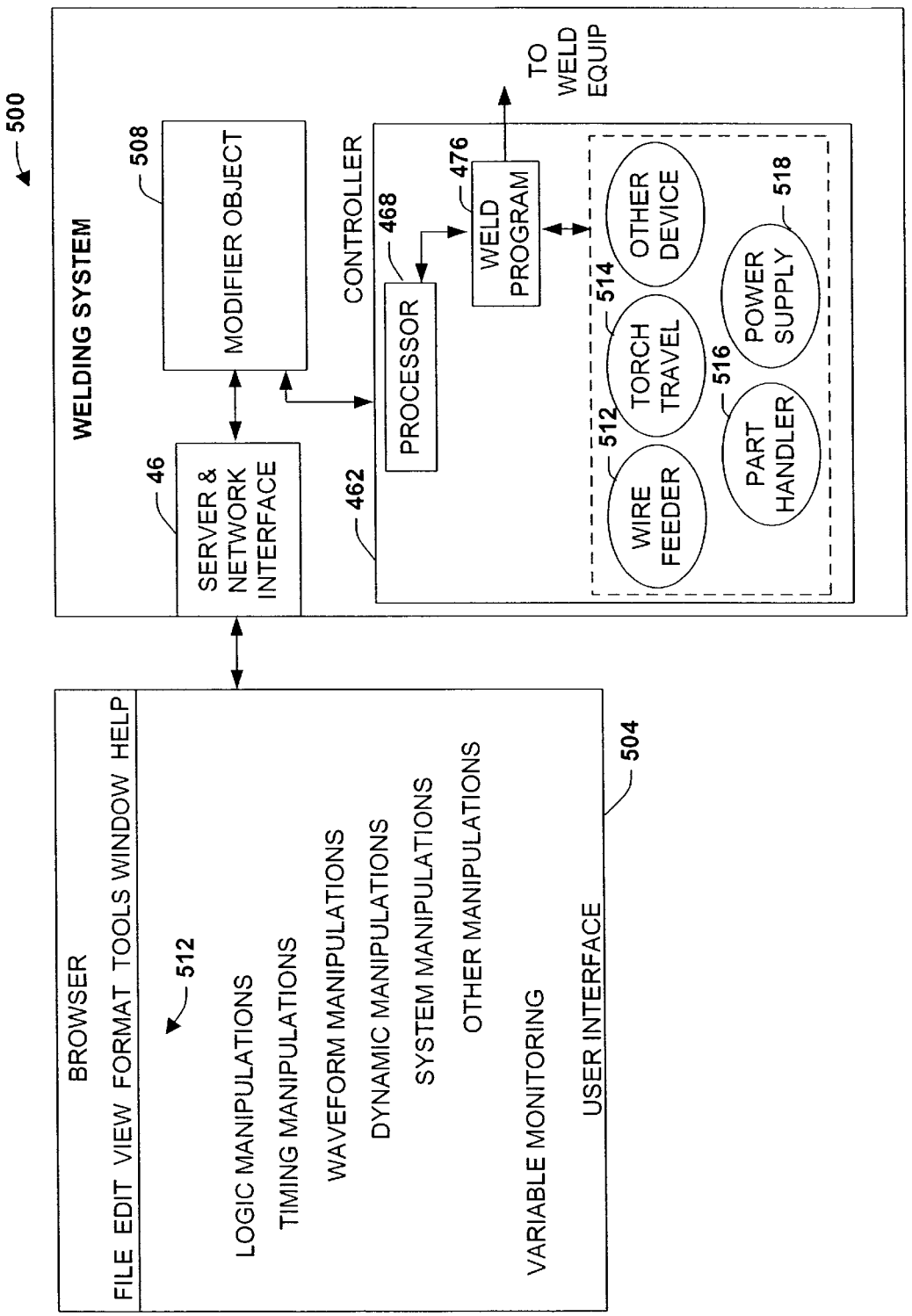
FIG. 9 is a schematic block diagram illustrating a configuration and monitoring user interface in accordance with an aspect of the present invention.

Referring now to FIG. 9, a system 500 illustrates a remote user interface in accordance with the present invention. A remote interface 504 invokes a modifier object 508 that has access to the welding controller 462 and weld program 476 and drives the interface 504. The weld program 476 may control welding system functional aspects such as a wire feeder 512, a torch travel 514, a part handler 516 and a power supply 518. The remote interface 504 may include a Graphical User Interface (GUI) and provide a standard tool bar 512 (e.g., file, edit, view, format, tools, window, help). A user may manipulate aspects of the welding system via the remote interface 504 and tool bar 512. These manipulations may include logic, timing, waveform behavior, dynamic behavior, and system manipulations, for example. Additionally, the user may monitor weld system variables from the remote interface 504 to perform maintenance or servicing of remote welding systems.

Figure 10:
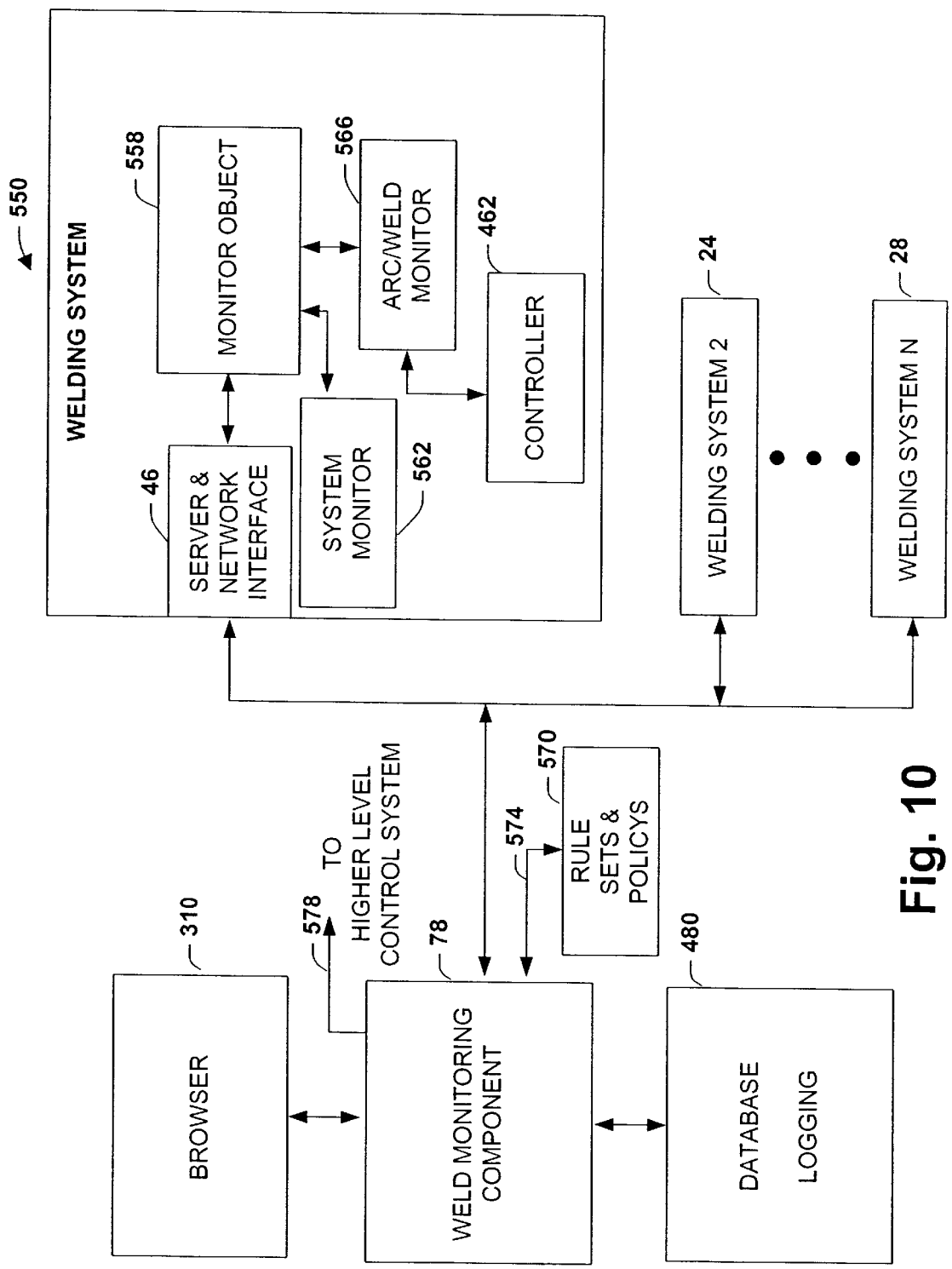
FIG. 10 is a schematic block diagram illustrating a weld monitoring system in accordance with an aspect of the present invention.

Referring to FIG. 10, a system 550 illustrates a more detailed remote monitoring architecture in accordance with the present invention. A welding system 554 may include a monitor object 558 that collects data variables from a system monitor 562 and an arc/weld monitor 566. The monitor object 558 may be invoked from the remote browser 310 or the weld monitoring component 78. Data variables collected from one or more welding systems may be aggregated by the weld monitoring component 78 and logged to the database 480. This data may be analyzed by the browser 310 in order to service and maintain the remote welding systems 554 and systems 24–28. As an alternative, a rule set or policy component 570 may be provided to monitor data variables provided by the remote welding systems. The rules or policies may include threshold values wherein if the data variables are above or below a predetermined threshold, the weld monitoring component 78 is alerted via a flag 574 and may then take further actions such as notifying an operator and/or other remote system. As will be described in more detail below, the weld monitoring component 78 also provides feedback 578 to the higher-level control component 82 and to the business transaction component 86.

Figure 11:
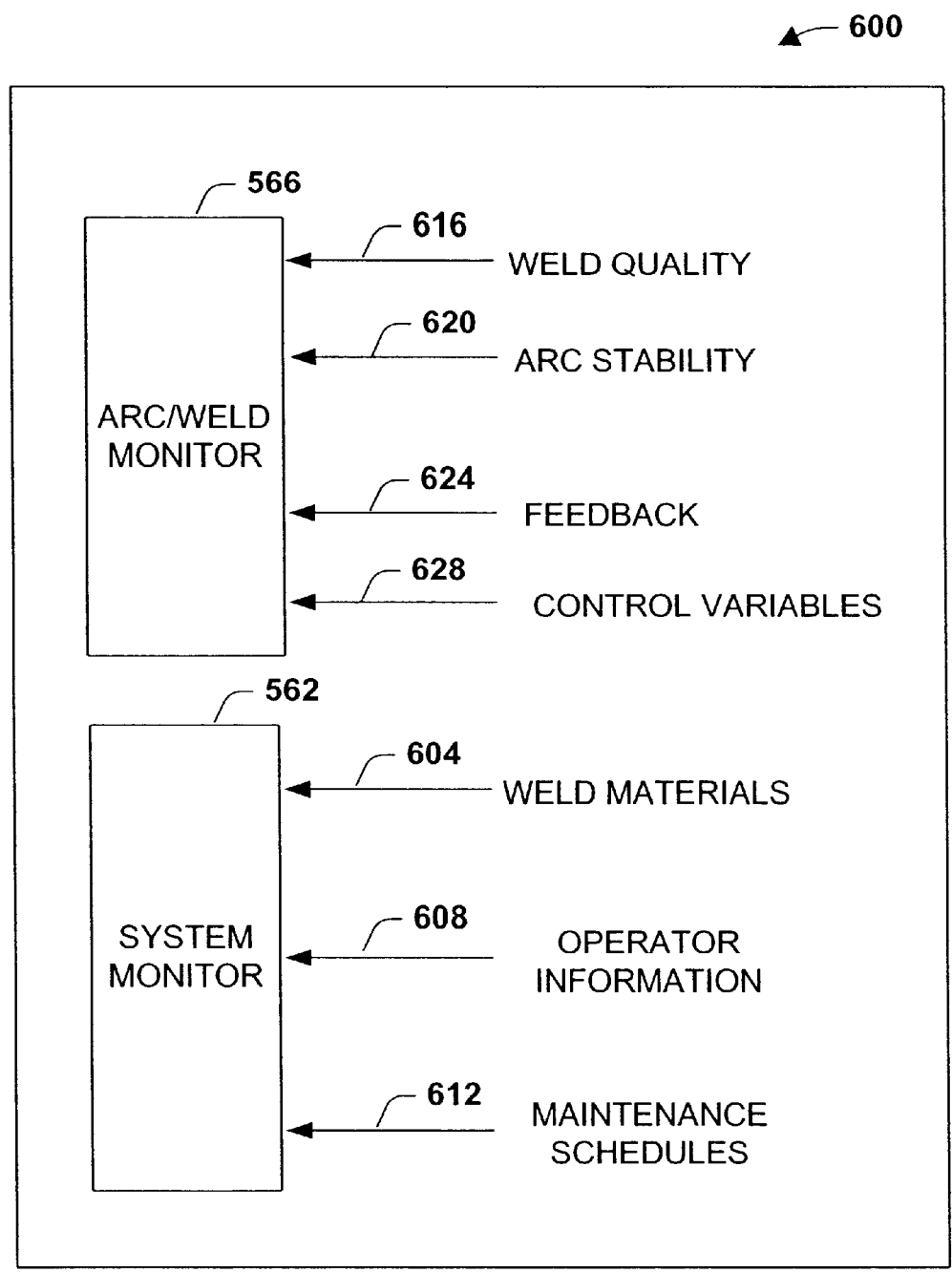
FIG. 11 is a diagram illustrating a more detailed control and system monitor in accordance with an aspect of the present invention.

Referring briefly to FIG. 11, a system 600 illustrates the system monitor 562 and arc/weld monitor 566 in more detail. The system monitor 562 may include inputs for receiving weld process information such as relating to weld supply materials 604. This may include inputs such as wire, gas, and parts supply availability or usage associated with the welder. An operator input 608 may include such information as when the operator has started and stopped a shift and may include other information such as reported and/or flagged operator problems relating to the welding process. A maintenance schedules input 612 may provide information about a particular welders date and time for routine servicing and/or shutdowns. The arc/weld monitor 566 provides various types of control information. For example, this information may include receiving weld quality data 616, arc stability data 620, controller feedback data 624 and a plurality of other control variables 628 such as timers, counters, and other data elements.

Figure 12:
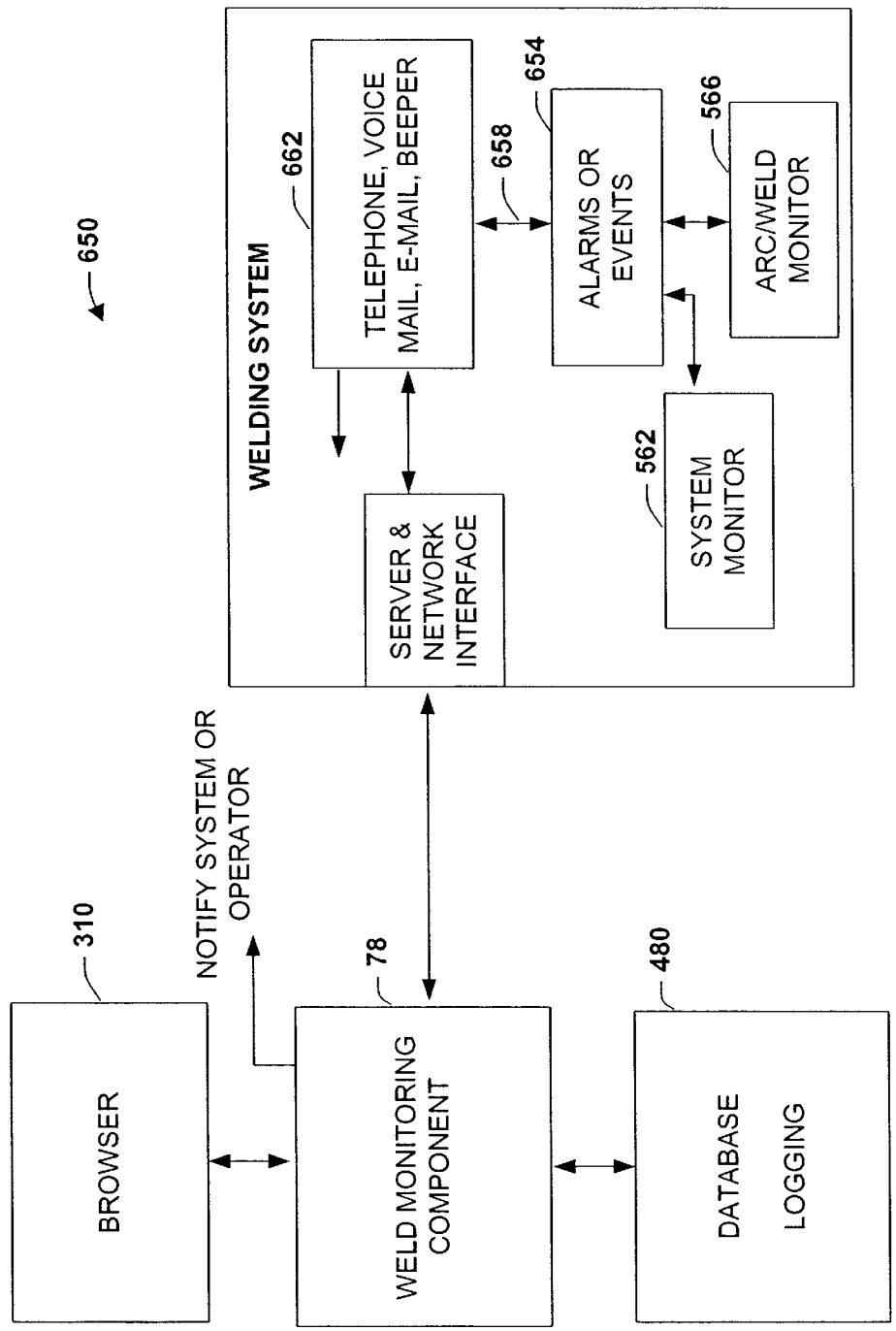
FIG. 12 is a schematic block diagram illustrating a welding alarm system in accordance with an aspect of the present invention.

Referring to FIG. 12, a system 650 illustrates alarm notification in accordance with the present invention. The system 650 includes an alarms or events component 654 that monitors the system monitor 562 and arc/weld monitor 566. The alarms component 654 may be triggered from predetermined data threshold values or may be driven by a system event such as a processor interrupt. If an alarm is triggered, an alarm output 658 may flag a notification object or objects 662. The notification object 662 may include components such as for delivering telephone messages, voice mail messages, e-mail messages, and/or beeper messages, for example. The weld monitoring component 78 may receive an unsolicited message from the notification object 662 and provide this information to the browser 310, to the database 480, and/or to other remote systems or users.

Figure 13:
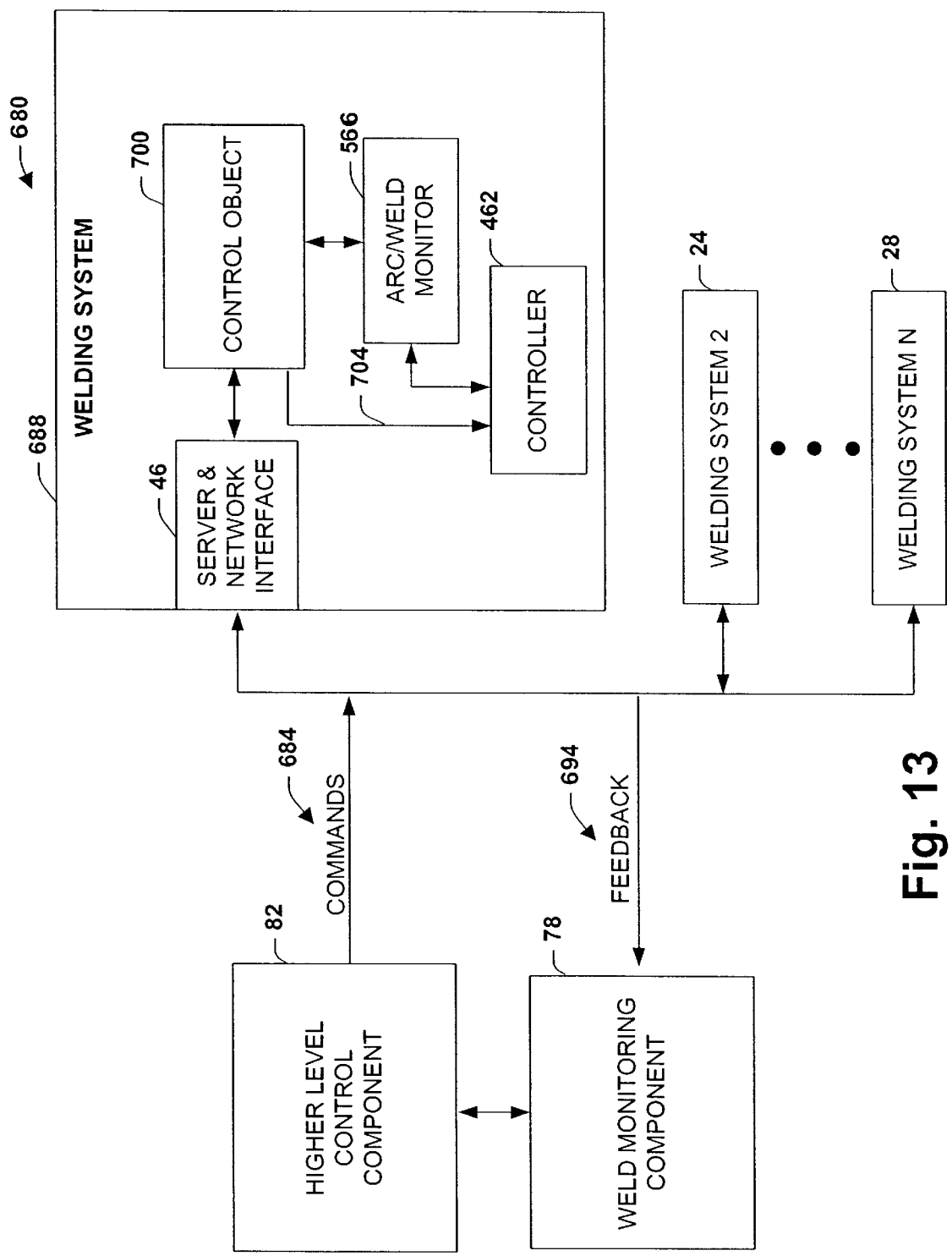
FIG. 13 is a schematic block diagram illustrating a higher-level welding control system in accordance with an aspect of the present invention.

Referring to FIG. 13, a system 680 illustrates a higher-level control architecture in accordance with the present invention. The higher-level control component 82 (HLCS) generates an asynchronous/synchronous control command 684 that may be broadcast to one or more remote welding systems 688 and 24–28, for example. In asynchronous command mode, the HLCS 82 may simply issue a start weld command, for example, and monitor aggregated feedback 694 received from all welding systems via the monitoring component 78 and not issue another command until all welders have completed the previous command. Each welder is thus free to operate independently from other welders. In synchronous mode, each welding system may be synchronized to a real time clock (not shown), for example. When each welder receives a command 684, network handshaking may occur between the welders wherein each welder agrees to start execution at a predetermined time of the real time clock. As described above, datagram sockets and protocol may be employed to command multiple welding systems because of the burst mode nature of the protocol. As illustrated, a control object 700 may be invoked by the HLCS 82 that provides local control commands 704 to the controller 462 and provides arc/weld monitor 566 feedback to the weld monitoring component 78.

Figure 14:
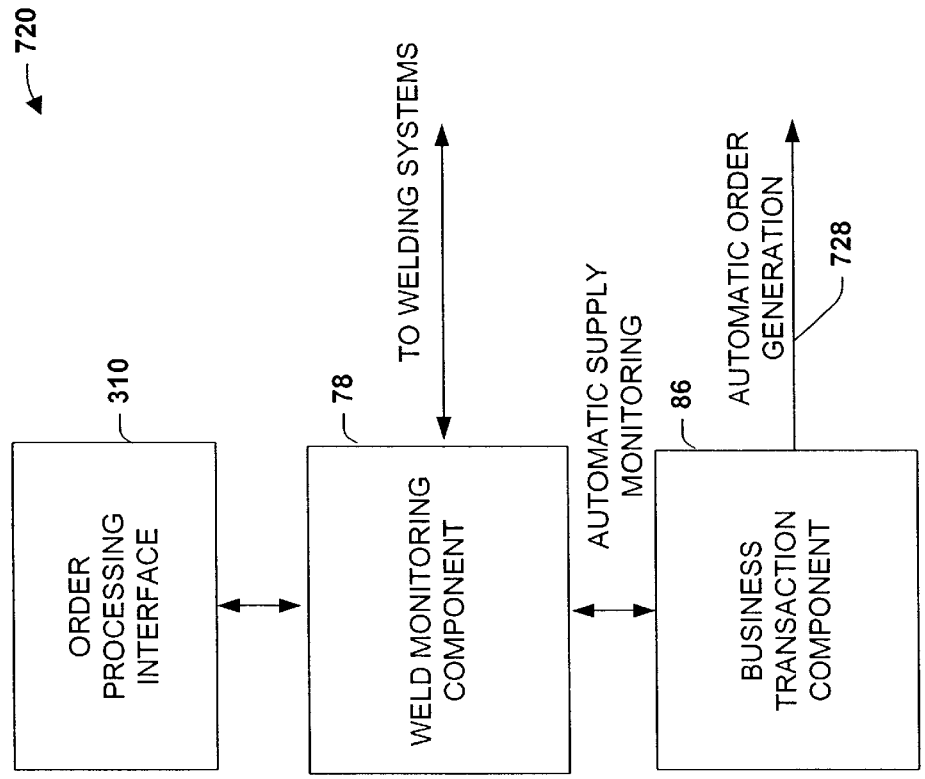
FIG. 14 is a schematic block diagram illustrating a welding business transaction system in accordance with an aspect of the present invention.

Turning now to FIG. 14, a system 720 illustrates an automated business transaction architecture in accordance with the present invention. The system 720 includes the business transaction component 86 (BTC) that receives welding materials and supply information 724 from the weld monitoring component 78. The supply information 724 is monitored by the BTC 86 and compared to predetermined supply/material threshold values. If the supply information 724 drops below a predetermined threshold, the BTC 96 automatically generates an order via network output command 728. Automatic order generation may be achieved by looking up customer information in a database and shipping welding materials that are either supplied as demand requires or are supplied by pre-agreement with the customer. As an alternative, orders may be processed manually via the browser 310 that is configured with and order processing user interface. Manual orders can be determined by viewing remote monitoring information and manually generating a work order through the browser 310 to satisfy customers needs.

Figure 15:
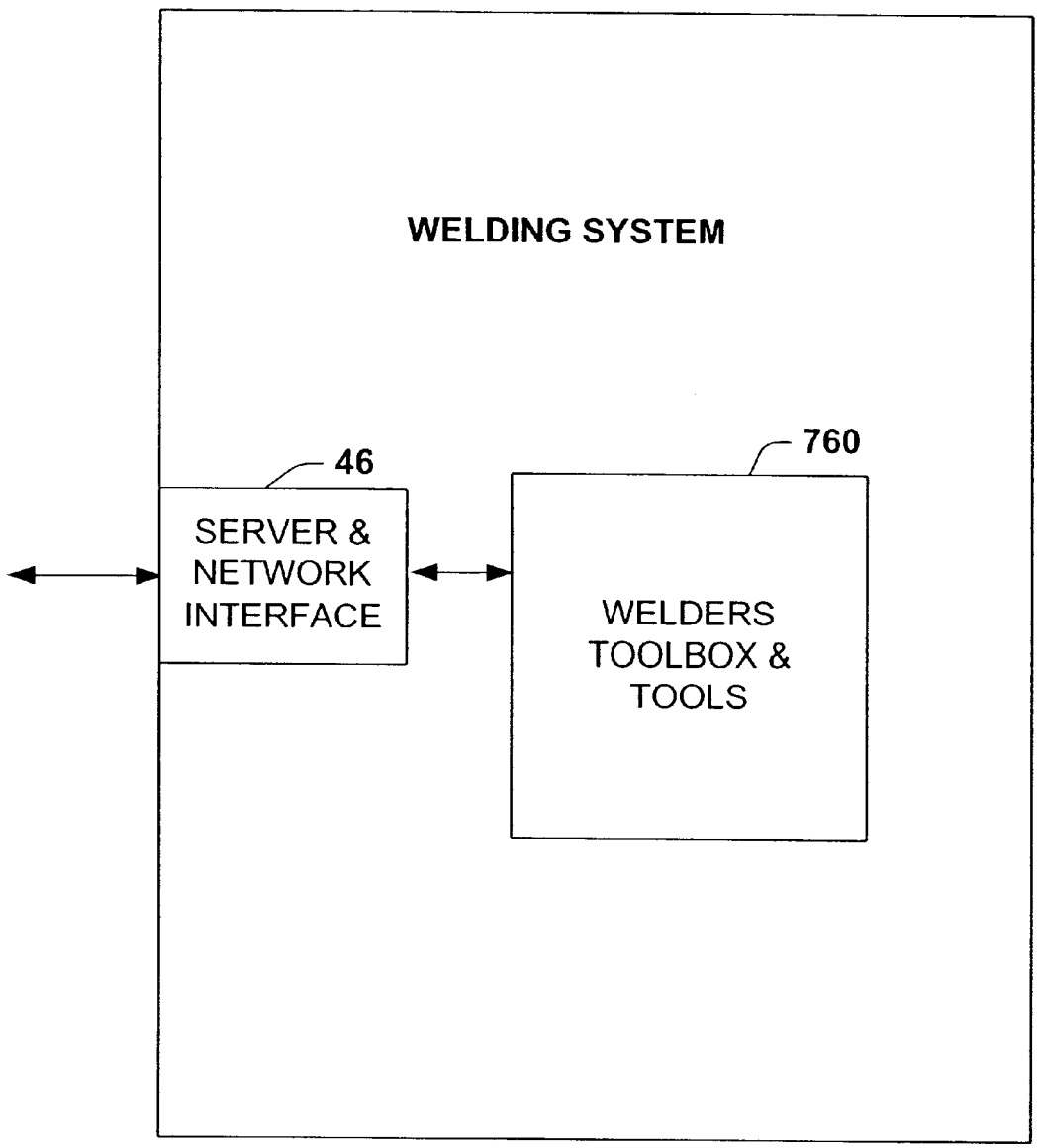
FIG. 15 is a schematic block diagram illustrating a welding support system in accordance with an aspect of the present invention.

Referring to FIG. 15, a welders toolbox 760 and associated tools may be provided with the network server 46 of the present invention to assist weld operators and designers in the course of the overall welding process. As an example, the welding toolbox 760 may provide tools such as a ferrite number predictor of stainless steel welding, a CCT diagram with cooling curve acquired from the weld, a carbon equivalent calculator, a metric-English converter for common welding units, a hardness unit converter, a temperature unit converter, a gauge unit converter, a deposition rate calculator, a torch travel speed and deposition efficiency calculator; a weld size and bead shape estimator for single and multipass welding on various joint designs, an interpass temperature calculator, a residual stress and distortion predictor, a mechanical property predictor (hardness, ductility, yield strength, fatigue strength, corrosion resistivity), a heat input calculator, and an AWS welding code. Other tools may include a preheat/postheat calculator, welding cost estimator, wire selector, gas selector, weld joint CAD tool, multipass planner, base metal selector, fatigue strength estimator, tensile strength predictor, impact strength predictor, and weld defect estimator. It is to be appreciated that other welding tools may be similarly added to the toolbox 760.

Figure 16:
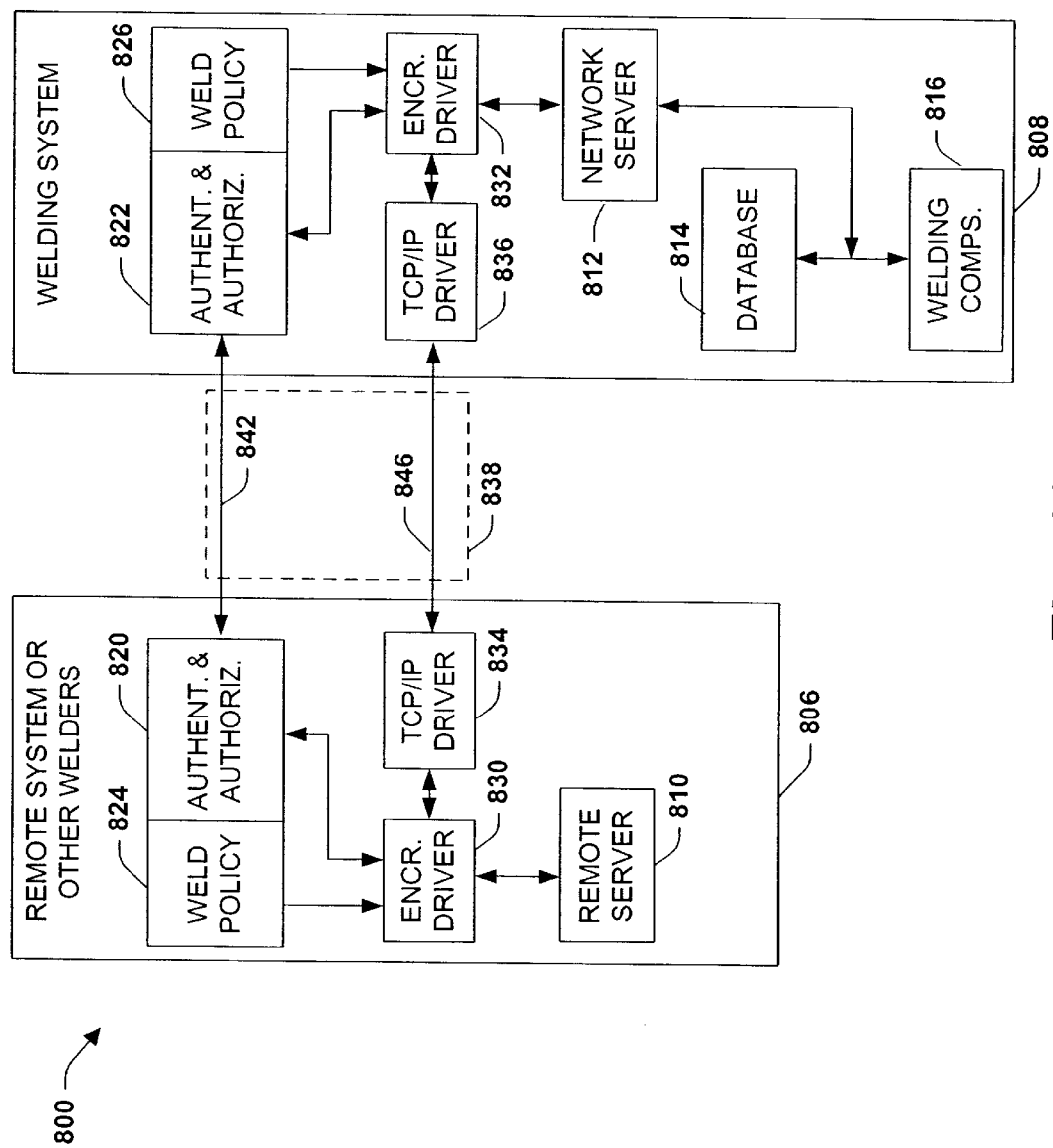
FIG. 16 is a schematic block diagram illustrating a welding security system in accordance with an aspect of the present invention.

Referring now to FIG. 16, a system 800 illustrates a welding and network security system in accordance with an aspect of the present invention. Given that weld control and monitoring information may be transferred over public networks such as the Internet, the system 800 provides encrypted data communications along with authentication and authorization services between a remote system 806 and one or more other welding systems 808. The remote system 806 may include a remote server 810 to communicate with a network server 812, database 814, and associated weld components 816 within the welding system 808. Authentication refers to a determination that a purported user or system is whom they claim to be. Authorization is the process of verifying that a user or system has been authorized by the welding system 808 to access welding system resources. Encryption is the conversion of data into a form, such as a ciphertest, that is not easily understood by unauthorized agents.

According to one aspect of the present invention, authentication, authorization, and non-repudiation may be established utilizing one or more of the following protocols. A Public Key Infrastructure (PKI) and X.509 Public Key Infrastructure Certificates may be employed to provide authentication and message integrity. A Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETE) and in other sources.

According to another aspect of the present invention, encrytion may be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETE) and in other sources.

The system 800 includes an Authentication and Authorization (AA) subsystem 820 and 822 for securing network traffic 838 between systems 806 and 808. The system 800 may also include weld policy modules 824 and 826 to enable configuration of the AA subsystems 820 and 822. The weld policy modules 824 and 826 may also provide security configuration information to encryption drivers 830 and 832 that communicate via TCP/IP drivers 834 and 836 thereby enabling secure network traffic 838 between the systems 806 and 808. A negotiation 842 may be initiated between the AA subsystems 820 and 822 in order to establish a machine level and/or user level trust between the systems. It is to be appreciated that other negotiations may occur between the remote system 806 and the welding system 808. These negotiations may be utilized to establish a secure (e.g., encrypted) data channel 846, for example, between the TCP/IP drivers 834 and 836.

The weld policy modules 824 and 826, retrieve a configured set of local security policies (e.g., from database or local cache) and distribute authentication and security settings to the AA modules 820, 822, and to the encryption Drivers 830,832. The security policies may be employed to define the levels of security and access provided to the welding system 808. For example, these policies may define access based upon the type of user. A systems engineer or supervisor, for example, may be granted access to all portions of the welding system 808 such as to enable configurations and or modifications within the welding system. In contrast, an operator, may be granted another type of security, wherein only those portions of the welding system 808 may be accessed to enable actual machine and/or manufacturing operations associated with the welding process. Welding policies may also be configured such that the type of machine, network access and/or location defines the level of access to the welding system 808. For example, local systems communicating over a local factory Intranet may be given a higher degree of access to the welding system than remote systems communicating from outside the factory over the Internet. It is to be appreciated that many other policies and/or rule sets may be configured to define user, machine, and/or location access to the welding system 808.

FIGS. 17 through 22 illustrate a methodology for providing various aspects of a distributed welding architecture in accordance with the present invention. The method comprises a group of actions or processes represented by blocks. While, for purposes of simplicity of explanation, the methodology is shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Figure 17:
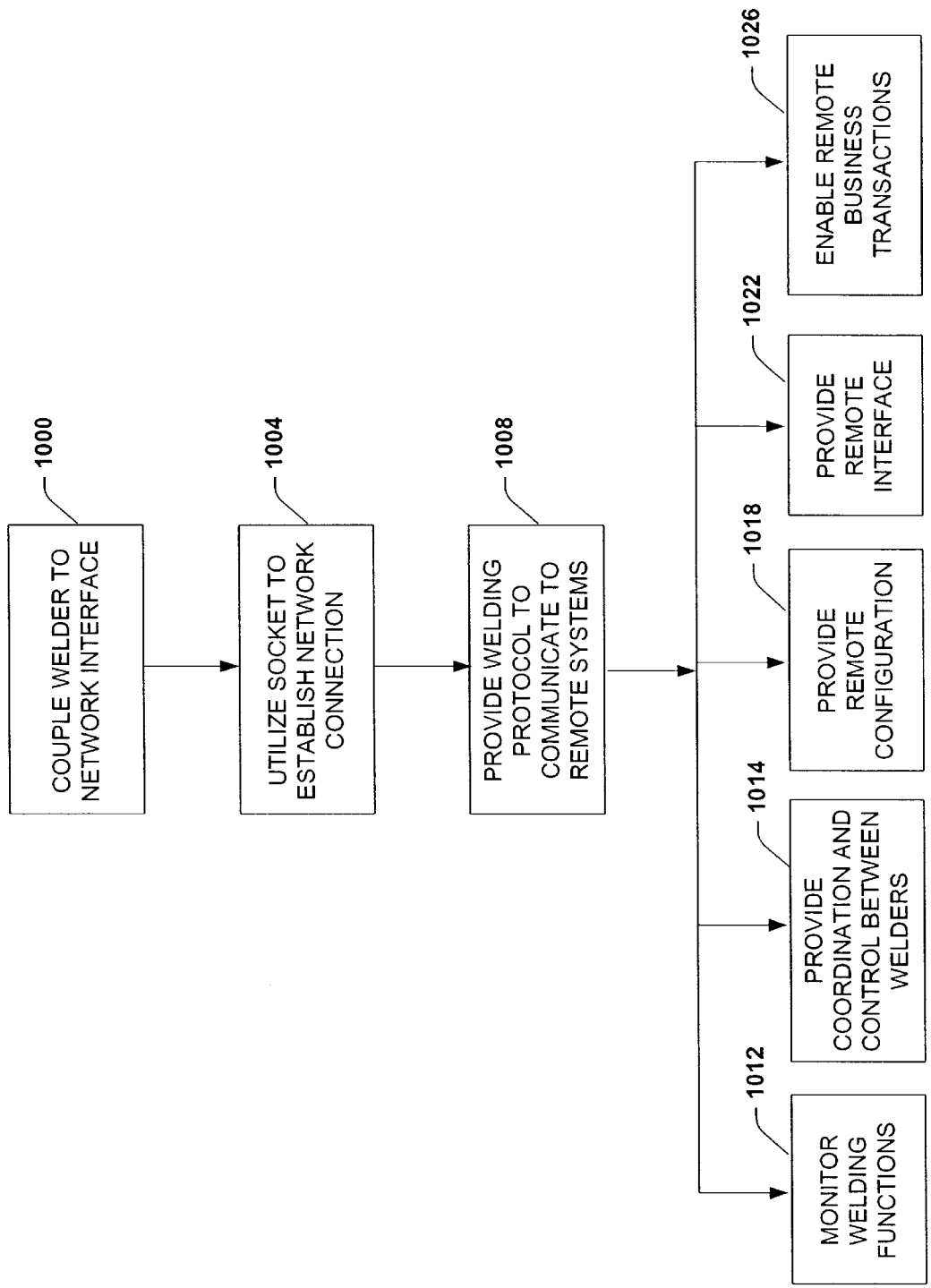
FIG. 17 is a flow chart diagram illustrating a methodology providing a distributed welding architecture in accordance with an aspect of the present invention.

Turning now to FIG. 17, a methodology for a distributed welding architecture in accordance with the present invention is provided. Beginning at act 1000, a welder is coupled to a network interface. At act 1004, a socket adapted to welding systems is utilized to establish a network connection. The sockets may include stream and/or data gram sockets. At act 1008, a welding protocol is provided to communicate with remote systems. The welding protocol is adapted to configure various functional aspects of welding systems and network servers. After act 1008, acts 1012–1026 may execute substantially in parallel and/or at different points in time. These acts may include a monitoring welding functions at act 1012, coordinating and controlling one or more welders at act 1014, providing remote configuration at act 1018, providing a remote interface at act 1022, and/or enabling remote business transactions at act 1026.

Figure 18:
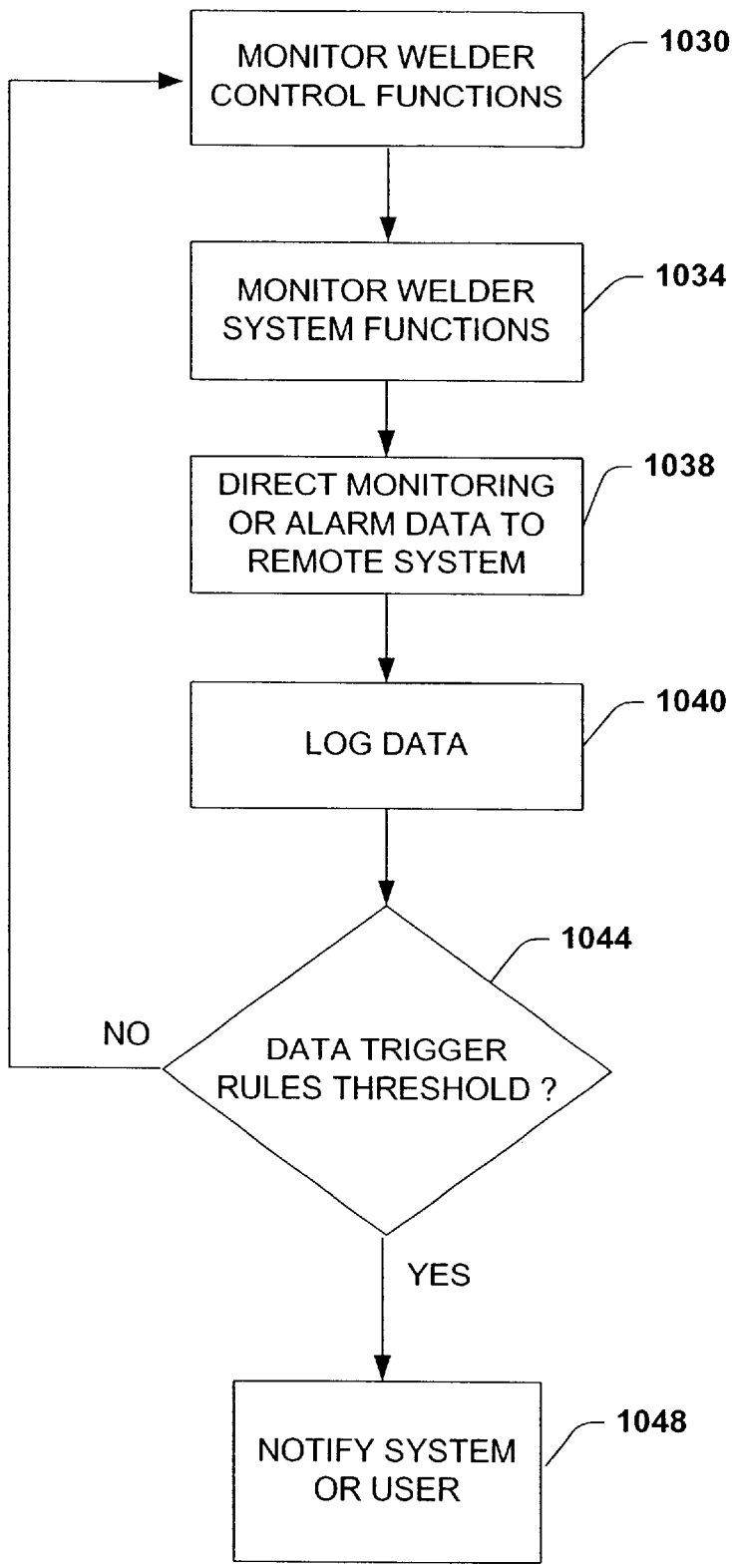
FIG. 18 is a flow chart diagram illustrating a remote weld monitoring process in accordance with an aspect of the present invention.

Referring now to FIG. 18, a more detailed process illustrates a methodology for monitoring welding functions as depicted at act 1012 in FIG. 17. At act 1030, welding control functions are monitored. This may include querying or receiving control variables or other data elements that record activities within a welding control system. At act 1034, welding system functions are monitored. This may include querying control variables or other data elements that record activities within a welding system such as operator activities and maintenance schedules. As an alternative, control or system variables illustrated at act 1030 and 1034 may be received as an unsolicited event. For example, an alarm may occur within the welding system prompting an unsolicited message, such as an e-mail, to be sent from the welding system to the remote system, wherein the message is processed outside of the blocks or acts depicted in FIG. 18. At act 1038, monitoring and/or other alarm data is directed to a remote system wherein the data may be logged in a database at act 1040. At act 1044, a determination is made as to whether the logged data at act 1040 has triggered any predetermined alarm thresholds. If no threshold has been exceeded at act 1044, the process proceeds back to act 1030 and continues to monitor data. If the threshold has been exceeded at act 1044, the process proceeds to act 1048 and notifies a system and/or user about the conditions that triggered the notice at act 1044.

Figure 19:
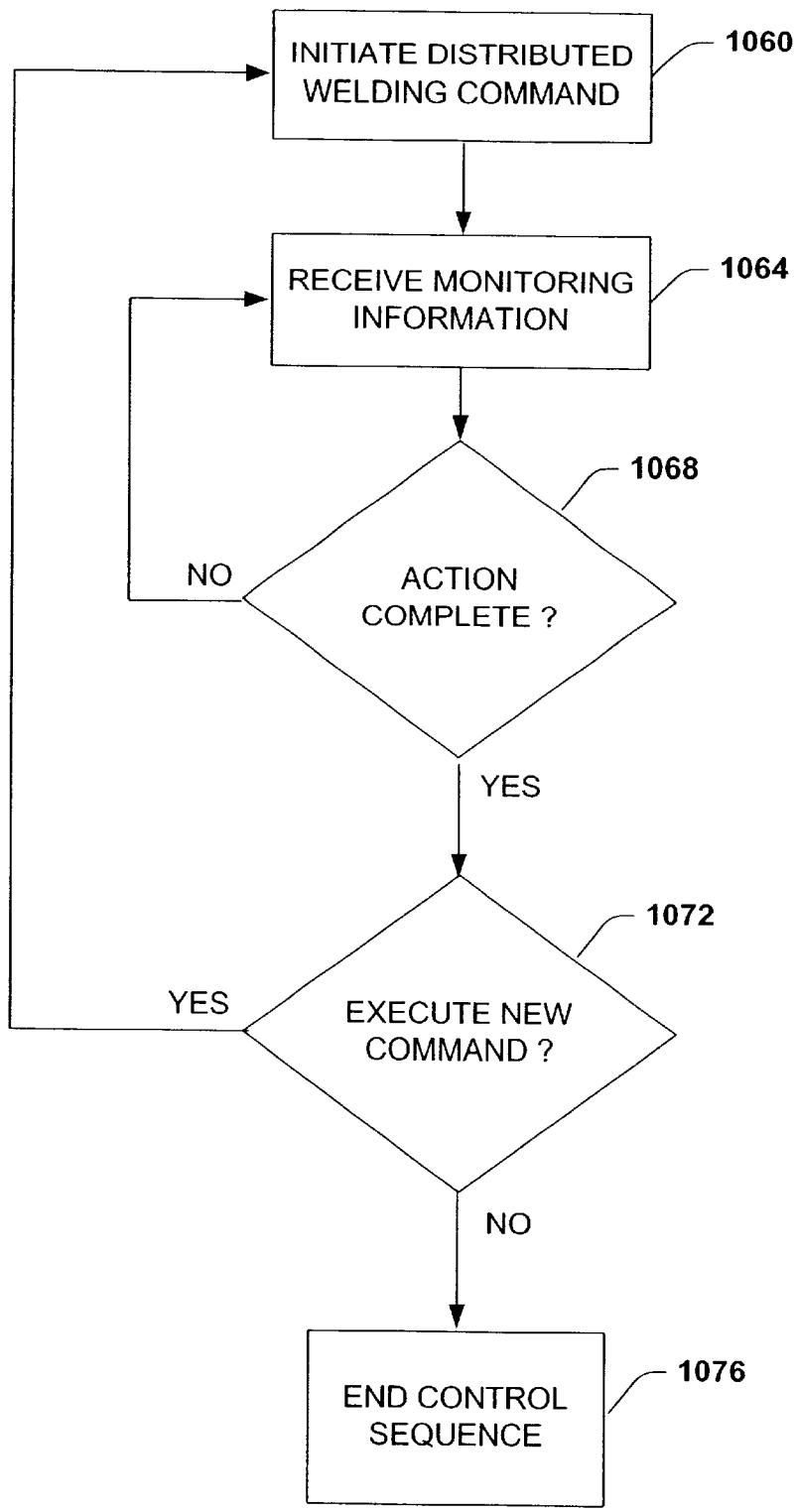
FIG. 19 is a flow chart diagram illustrating a remote weld control process in accordance with an aspect of the present invention.

Referring now to FIG. 19, a more detailed process illustrates a methodology for coordinating and controlling welding functions as depicted at act 1014 in FIG. 17. At act 1060, welding commands are distributed to one or more welding systems. At act 1064, monitoring information is received as feedback from the welding systems. At act 1068, a determination is made as to whether the command action initiated at act 1060, is complete. If the action is not complete, the process proceeds back to act 1064 and proceeds to monitor information from the welding systems. If the action is complete at act 1068, the process proceeds to act 1072. At act 1072, a determination is made as to whether new commands should be executed. If new commands should be executed at act 1072, the process proceeds back to act 1060. If no new commands are to be executed at act 1072, the process proceeds to act 1076 and ends the control sequence.

Figure 20:
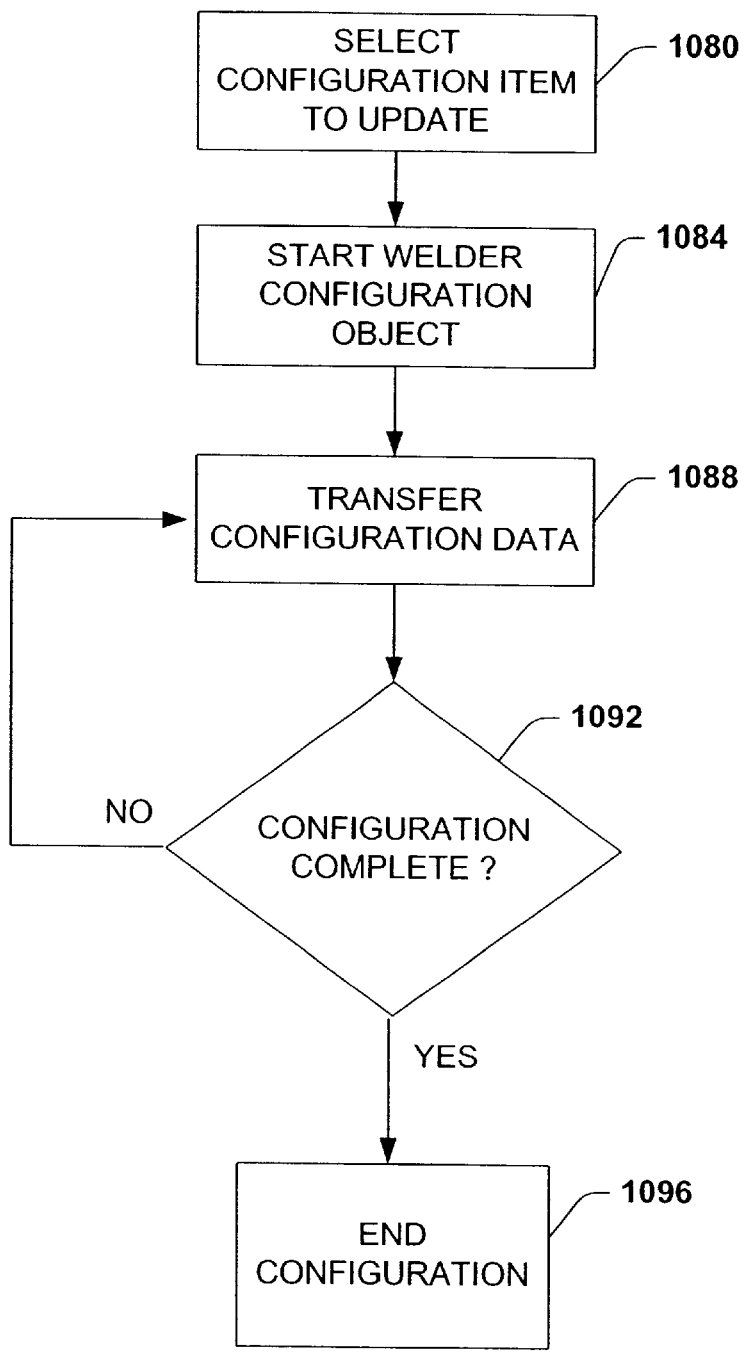
FIG. 20 is a flow chart diagram illustrating a remote weld configuration process in accordance with an aspect of the present invention.

Referring now to FIG. 20, a more detailed process illustrates a methodology for providing remote welding configuration as depicted at act 1018 in FIG. 17. At act 1080, a configuration item to be updated is selected from a database. These items may include processor firmware, processor logic, and procedures associated with the welding system. At act 1084, a welding configuration object is started on the welding system. At act 1088, configuration data is transferred to the welding configuration object. At act 1092, a determination is made as to whether the configuration object has completed updating the welding system. If the configuration is not complete at act 1092, the process proceeds back to act 1088. If the configuration is complete at act 1092, the process proceeds to act 1096 and ends the configuration.

Figure 21:
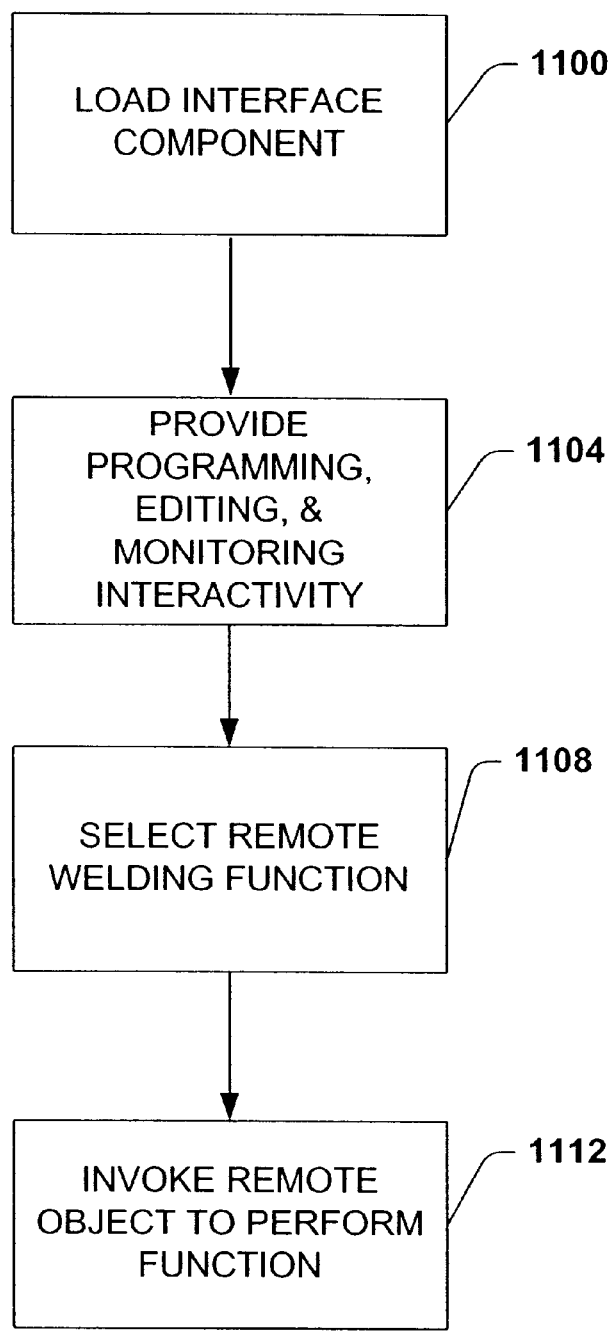
FIG. 21 is a flow chart diagram illustrating a remote weld interface process in accordance with an aspect of the present invention.

Referring now to FIG. 21, a more detailed process illustrates a methodology for providing a remote interface as depicted at act 1022 in FIG. 17. At act 1100, an interface component is loaded in a remote browser, for example. At act 1104, programming, monitoring, and editing functions are provided with the interface component. At act 1108, a remote welding function is selected from the interface component. At act 1112, a remote welding system object is invoked to perform the selected function of act 1108.

Figure 22:
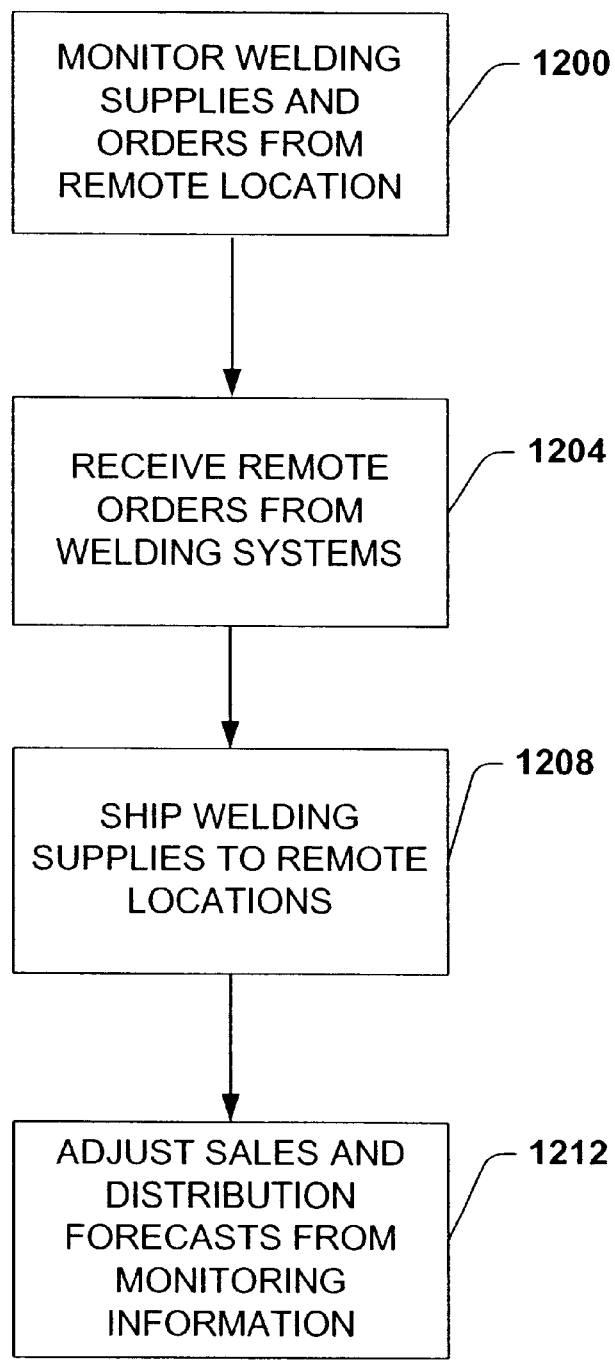
FIG. 22 is a flow chart diagram illustrating a remote weld business transaction process in accordance with an aspect of the present invention.

Referring now to FIG. 22, a more detailed process illustrates a methodology for providing business transactions as depicted at act 1026 in FIG. 17. At act 1200, welding system supplies and materials are monitored and are automatically and/or manually ordered from a remote location. At act 1204, remote orders are received and automatically processed at the remote system. At act 1208, welding supplies are shipped to the welding systems that have placed the orders at act 1200. At act 1212, sales and distribution forecasts are adjusted to account for the monitoring information received from a plurality of welding systems.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A distributed welding system, comprising:
   a welder operatively coupled to a network interface;
   at least one HTTP socket employed for web communications via the network interface, the HTTP socket employed to load at least one application from the welder; and
   at least one Welding Application socket to exchange information between the welder and the at least one application, the at least one application includes at least one of a weld configuration component, a weld monitoring component, and a weld control component to interact with the distributed welding system.

2. The system of claim 1, wherein the server is at least one of a web server and an HTTP server, and the remote interface is a web browser.

3. The system of claim 1, wherein the application is at least one of a Java applet or a Java application.

4. The system of claim 1, wherein the Welding Application socket includes at least one of an HTTP socket, an FTP socket, an SMTP socket, an RPC socket, an RMI socket, a JDBC socket, an ODBC socket, an SSL socket, an NFS socket, a Winsock, a POP3 socket and a TELNET socket.

5. The system of claim 4, farther comprising a client to proxy requests over the Welding Application socket to or from the welder's native system.

6. The system of claim 5, further comprising at least one control processor, a native welding Local Area Network (LAN) coupling the at least one control processor, and one or more logical processes or objects executing on the at least one control processor.

7. The system of claim 6, further comprising a database to provide access to methods or properties exhibited by each object.

8. The system of claim 1, wherein the application requests at least one web page from the welder via the at least one HTTP socket.

9. The system of claim 8, wherein the at least one web page is dynamically generated by the welder containing live welder operating parameters.

10. The system of claim 8, wherein the at least one web page is parsed by the application to extract welder operating parameters, the welder operating parameters to be at least one of displayed graphically within the remote interface, processed by an algorithm, and recorded into a log file.

11. The system of claim 8, wherein at least one URL of the at least one web page includes at least one of commands, parameter settings changes, instructions or functions to be executed by the welder, when the at least one web page is requested by the remote system.

12. The system of claim 8, wherein the web page includes at least one of HTML, SHMIM, VB Script, JAVA, CGI Script, JAVA Script, dynamic HTML, ASP, XML, PDF, and WML format.

13. The system of claim 8, wherein the web page is utilized as a point of entry from other web server subsystems, wherein web content or data can be collected from the welder and the web server subsystems to present a unified view and control of the collective system.

14. The system of claim 13, wherein an applet is utilized to acquire data from the collective system to present the data within a browser.

15. The system of claim 14, wherein the applet and the web page reside on the same web server.

16. The system of claim 14, wherein the applet and the web page reside on different web servers.

17. The system of claim 1, wherein the Welding Application socket encapsulates a welder's native addressing and command arguments, wherein routing and request arguments are served by a welder's native network and operating system.

18. The system of claim 1, wherein the network interface employs at least one of Ethernet, Wireless Ethernet, PPP (point-to-point protocol), point-to-multipoint short-range RE (Radio Frequency), WAP (Wireless Application Protocol), Bluetooth, IP, IPv6, TCP; and User Datagram Protocol (UDP).

19. The system of claim 1, wherein the welder interfaces to at least one of another networked welder, a network of welders, a remote computer, an industrial controller, a robot, and a network device via a local network or the Internet.

20. The system of claim 1, wherein the network interface interfaces to at least one socket to provide communications to a network.

21. The system of claim 20, wherein the at least one socket is associated with a TCP/IP stack for communicating to the network.

22. The system of claim 21, wherein the TCP/IP stack is associated with at least one of a physical layer, a data-link layer, a session layer, a presentation layer, and an application layer.

23. The system of claim 21, wherein the at least one socket is a stream socket or a datagram socket.

24. The system of claim 21, further comprising a welding protocol to control and monitor the welder.

25. The system of claim 24, wherein the welding protocol includes at least one of options/flags field, a message sequence field, a message status field, a data length field, a data field, a server command field, a server command ID field, a server command arguments field, a machine field, a machine address field, a machine property/method ID field, and a method/property ID field.

26. The system of claim 1, further comprising one or more groupings of welding equipment that is instantiated via objects within the welder.

27. The system of claim 26, wherein the welding equipment is controlled from a least one of a remote network system or from one or more networked welders.

28. The system of claim 27, further comprising at least one of a LAN, a phone connection, and a gateway to couple to the network.

29. The system of claim 27, wherein the welder further comprises a welding communications network interface for interacting with the welding equipment separately from the network.

30. The system of claim 26, wherein the welder further comprises at least one of a weld properties and methods database, a weld controller and a weld I/O interface for controlling the welding equipment, the weld properties and methods database provides at least one object to interact with the welder, the weld controller controls at least one control loop and the weld I/O interface operatively couples to at least one control output, discrete output, and feedback input associated with the welding equipment.

31. The system of claim 1, further comprising applets that interact with a JAVA Virtual Machine at a remote interface.

32. The system of claim 1, wherein the welder includes at least one of a browser and a JAVA Virtual Machine to communicate with other welders and remote systems.

33. The system of claim 1, wherein the welder further includes an e-mail component and a communications component for transferring messages and files to and from the welder.

34. The system of claim 1, wherein the weld configuration component transfers at least one of welding programs, welding firmware, and welding procedures to enable modifications of the welder.

35. The system of claim 34, further comprising a graphical user interface (GUI) to enable remote configurations and monitoring of the welder.

36. The system of claim 35, wherein the GUI enables logic manipulations, timing manipulations, waveform manipulations, and dynamic manipulations associated with a welder program.

37. The system of claim 36, wherein the manipulations are associated with at least one of a wire feeder, a torch travel, a part handler, and a power supply.

38. The system of claim 1, wherein the weld monitoring component receives weld system and weld control variables from the welder and logs the variables in a database.

39. The system of claim 38, wherein the variables are associated with at least one of timers, counters, sequencers, integers, data elements, operator information, and diagnostics associated with the welder.

40. The system of claim 38, wherein the weld monitoring component examines predetermined rules and policies to determine whether to notify another system or remote user.

41. The system of claim 40, wherein the control commands are issued asynchronously or synchronously via at least one of a transmission control protocol (TCP) socket and a user datagram protocol (UDP) socket.

42. The system of claim 38, further comprising a monitor object that collects information from a control monitor object and a system monitor object, the control monitor object monitoring at least one of weld quality, arc stability, weld supplies, and weld feedback, the system monitor object monitoring at least one of operator shift schedules, system maintenance schedules, and operator procedures.

43. The system of claim 38, further comprising at least one of an alarm and an event for triggering messages from the welder.

44. The system of claim 43, wherein the messages are sent via a voice mail, e-mail, telephone, and beeper, to a remote system or remote user.

45. The system of claim 1, wherein the weld control component monitors feedback from at least one weld monitoring component and issues control commands to the welder and at least one other welder or welding network.

46. The system of claim 1, further comprising a welding toolbox providing at least one of a ferrite number predictor of stainless steel welding, a CCT diagram with cooling curve acquired from the a weld, a carbon equivalent calculator, a metric-English converter for common welding units, a hardness unit converter, a temperature unit converter, a gauge unit converter, a deposition rate calculator, a torch travel speed and deposition efficiency calculator; a weld size and bead shape estimator for single and multipass welding on various joint designs, an interpass temperature calculator, a residual stress and distortion predictor, a mechanical property predictor, a heat input calculator, preheat/postheat calculator, welding cost estimator, wire selector, gas selector, weld joint CAD tool, multipass planner, base metal selector, fatigue strength estimator, tensile strength predictor, impact strength predictor, weld defect estimator and an AWS welding code.

47. The system of claim 1, further comprising a business transaction component to automatically process remote welding supply orders and automatically initiate weld supply shipments.

48. The system of claim 47, further comprising a user interface to monitor remote welders and process the weld supply orders and weld supply shipments.

49. The system of claim 48 wherein a weld operator initiates business transactions from a browser included within the welder.

50. The system of claim 1, further comprising a security component that employs an SSL layer to facilitate communications over the network.

51. The system of claim 50, wherein the security component further comprises at least one of an Authentication and Authorization component, an encryption component, and a Weld Policy Module to facilitate communications over the network.

52. The system of claim 1, further comprising a computer-readable medium having computer-executable instructions for executing at least a portion of the distributed welding system.

53. A method to provide distributed welding coordination, comprising:
  coupling a welder to a network interface;
  utilizing at least one of an HTTP or a Welding Application socket to establish a network connection through the network interface to a remote system, wherein the HTTP socket is employed for web communications and the Welding Application socket is employed to exchange information between the welder and the remote system; and
  providing a welding protocol to communicate to the remote systems to enable distributed welding coordination, wherein the welding protocol includes at least one of options/flags field, a message sequence field, a message status field, a data length field, a data field, a server command field, a server command ID field, a server command arguments field, a machine field, a machine address field, a machine property/method ID field, and a method/property ID field.

54. The method of claim 53, further comprising at least one of the following acts:

monitoring welding functions;

coordinating and controlling between welders;

providing remote configuration capabilities;

providing a remote interface; and enabling remote business transactions.

55. The method of claim 54, wherein the act of monitoring welding functions further comprises:

monitoring control functions;

monitoring system functions;

directing monitoring and alarm data to a remote system or user;

logging the monitoring and alarm data; and notifying a system or user based upon the monitoring and alarm data.

56. The method of claim 54, wherein the act of coordinating and controlling between welders further comprises:

initiating distributed welding commands to at least one other welding system; and receiving monitoring information from the at least one other welding system to determine when the welding commands have completed.

57. The method of claim 54, wherein the act of providing remote configuration further comprises:

selecting a configuration item to update;

starting a welder configuration object to perform the update; and transferring configuration data to the welder.

58. The method of claim 54, wherein the act of providing a remote interface further comprises:

loading an interface component;

providing at least one of programming, editing, and monitoring interactivity with the interface component;

selecting remote welding functions; and invoking a remote object to perform the remote welding functions.

59. The method of claim 54, wherein the act of enabling remote business transactions further comprises:

monitoring welding supply and order information from remote location;

receiving remote orders from welding system;

shipping welding supplies to remote locations; and adjusting sales and distribution forecasts associated with the supply and order information.

60. A distributed welding system, comprising:

means for a coupling a welder to a server to enable a network architecture, the network architecture serving a means communicating with a remote system, the remote system including at least one of a remote interface, a weld configuration component, a weld monitoring component, and a weld control component within the distributed welding system, wherein the remote system includes a means for web communications and a means for exchanging information between the welder and the remote system; and means for providing a welding protocol to communicate to the remote system to enable distributed welding coordination, wherein the welding protocol includes at least one of options/flags field, a message sequence field, a message status field a data length field, a data field, a server command field, a server command ID field, a server command arguments field, a machine field, a machine address field, a machine property/method ID field, and a method/property ID field.

61. A data structure providing a welding protocol, comprising:

at least one of an options/flags field, a message sequence field, a message status field, a data length field, a data field, a server command field, a server command ID field, a server command arguments field, a machine field, a machine address field, a machine property/method ID field, and a method/property ID field.

62. A signal for communicating between welding systems, comprising:

a welder operatively coupled to a server and a network interface via a signal to enable a network architecture, the network architecture serving a network that communicates to at least one remote system via the signal with at least one of a remote interface, a weld configuration component, a weld monitoring component, and a weld control component, wherein the remote system includes at least one HTTP socket for web communications via the signal and at least one Welding Application socket to exchange information between the welder and the remote system via the signal.

63. The signal of claim 62, further comprising a welding protocol packet.

64. The system of claim 62 wherein the signal is transmitted via at least one of a network connection and a wireless connection.

65. A distributed welding system, comprising:

an application layer of TCP/IP associated with a Welding Application socket that encapsulates a native welding system addressing and command arguments;

an agent that communicates to the Welding application socket to proxy requests over the socket to and/or from the native welding system, wherein the native welding system includes at least one of one or more control processors and a native welding LAN distinct from the Welding Application socket to couple the one or more control processors.

66. The system of claim 65, further comprising one or more logical processes, tasks, and/or objects executing on the one or more control processors, wherein at least one of a database, a table and a spreadsheet provides access to methods or properties exhibited by each process.

67. The system of claim 65, herein the agent is embedded in the native welding system or resides externally on a gateway.

68. The system of claim 65, further comprising at least one application served by a web server that is resident on and/or remote to the native welding system that opens a Welding Application socket port to enable the application to address and control the welding system directly.

* * * * *